US008746895B2

(12) United States Patent
Archdale

(10) Patent No.: US 8,746,895 B2
(45) Date of Patent: Jun. 10, 2014

(54) COMBINED LIGHTING AND VIDEO LIGHTING CONTROL SYSTEM

(76) Inventor: Nick Archdale, London (GB)

( * ) Notice: Subject to any disclaimer, the term of this patent is extended or adjusted under 35 U.S.C. 154(b) by 4 days.

(21) Appl. No.: 13/216,216

(22) Filed: Aug. 23, 2011

(65) Prior Publication Data

US 2012/0126722 A1 May 24, 2012

Related U.S. Application Data

(60) Provisional application No. 61/275,906, filed on Aug. 23, 2010, provisional application No. 61/454,507, filed on Mar. 19, 2011.

(51) Int. Cl.
*G03B 21/20* (2006.01)

(52) U.S. Cl.
USPC .................. 353/85; 353/11; 353/31; 353/70; 353/94; 315/149; 315/158; 345/418

(58) Field of Classification Search
USPC ............ 353/7, 10, 11, 29, 31, 69, 70, 71, 85, 353/94; 348/14.16, 14.01, 14.08, E7.08, 348/744, 745; 345/418, 419, 430, 434, 435, 345/437, 438, 439; 715/848, 776, 784, 839, 715/854; 315/149, 158, 294, 312
See application file for complete search history.

(56) References Cited

U.S. PATENT DOCUMENTS

| | | | | |
|---|---|---|---|---|
| 5,896,133 | A * | 4/1999 | Lynch et al. | 715/784 |
| 8,042,954 | B2 * | 10/2011 | Tan et al. | 353/94 |
| 2006/0203207 | A1 * | 9/2006 | Ikeda et al. | 353/70 |
| 2009/0002363 | A1 * | 1/2009 | Wu et al. | 345/419 |

* cited by examiner

*Primary Examiner* — Sultan Chowdhury

(57) ABSTRACT

Disclosed is an abstracted lighting control system abstracted based on the lighting canvas rather than the mapping of the location of the luminaires or lighting fixtures.

66 Claims, 19 Drawing Sheets

310

309

308

COMBINED LIGHTING AND VIDEO LIGHTING CONTROL SYSTEM

RELATED APPLICATION

The present application claims priority on Provisional Application No. 61/275,906 filed on 23 Aug. 2010 and Provisional Application No. 61/454,507 filed 19 Mar. 2011.

TECHNICAL FIELD OF THE INVENTION

The present invention generally relates to a method for controlling lighting and video, specifically to methods relating to synthesizing a dynamic lighting configuration in a live environment in response to user input and environmental conditions.

BACKGROUND OF THE INVENTION

Live entertainment events such as theatre performances, television and film production, concerts, theme parks, night clubs and sporting events commonly use very large and complex lighting and video arrangements to allow the designers full artistic control over the spectacle being shown to the audience. In order to manage these systems, there has been steady development into highly sophisticated control systems capable of handling thousands of controlled lighting instruments. Examples of lighting instruments include everything from a simple spotlight where the only controllable parameter is the intensity of the luminaire, through fully controllable automated lights where, not only is intensity remotely controllable, but also color, beam shape, movement and position, focus and many other parameters. In recent years we have also seen an explosion in the use of LED based luminaires where arrays of differently colored emitters, perhaps red, green and blue, may be controlled in real time to provide dynamic color effects. In addition, the entertainment technology industry has seen increasing use of video based products such as projectors and LED based video walls where the designer potentially has individual control over every pixel of a display. With a large lighting rig at a concert commonly containing hundreds of lighting instruments as well as myriads of pixel mapped video displays, the need for control systems that reduce the complexity of the system for the operator and provide assistance in managing thousands of control channels in real time has become paramount. FIG. 1 illustrates a typical. lighting control system 10 with a control desk 11 connected via data-links 12 to controlled devices. The controlled devices may include, but not be limited to, automated luminaires 20, non-automated luminaires 21, LED luminaires 22, LED array luminaires 23, video projectors 24, pixel mapped video wall 25, and lasers 26 any similar light emitting and imaging devices.

Historically lighting control systems have been linearly programmed systems, where every parameter of every attached device can be accessed individually or in groups, adjusted, and stored for later retrieval and playback. The operator must work through each and every luminaire or video device they wish to use and set the relevant parameters for every cue. This gives the operator complete control but is very time consuming and, with some of the huge systems in use today, may actually be impossible to achieve within the time constraints of the event. This programming methodology also makes no allowance for changing conditions during live events—the programmed show is frozen and will be played back verbatim unless manually adjusted from the control system by an operator. This is an asset in that the lighting performance will precisely match the pre-programmed rehearsal, but is also a constraint as it does not allow the lighting to follow variations in the performance that are common in live events. There have been many attempts to improve lighting and show control systems to provide the operator with the ability to dynamically modify the live show in real time by means such as manual overrides and the exposing of some parameters as real-time controls. However such systems are still operator constrained and the control system itself provides no direct assistance other than allowing the user to override pre-programmed values. A highly skilled operator familiar with the particular lighting program is always needed and, even then, there are limitations as to what they are physically capable of modifying during a rapidly changing live event.

An example of an early prior art system controller that attempted to address these issues is illustrated in FIG. 2. This lighting control system concept from the early 1990's was aimed at the then burgeoning night club and rave market. The intent was that the lighting controller was not linearly programmed step by step, cue by cue, as described above, but instead just configured by the installer. The lighting looks would then be generated algorithmically by the controller itself at run time in response to a highly abstracted user interface and audio or MIDI input.

This prior art system to control conventional entertainment lighting instruments, automated moving lights in particular. Configuration by the installer entailed selecting the connected luminaires from a library, positioning them in 3D space, and storing within the system some critical positions for the luminaires.

The controller's user interface is shown in FIG. 2. The central principle was based around categorizing lighting looks as levels of "heat" through the grid 15 of Twenty (20) backlit buttons 14 to the left (Marked Red, Amber, Yellow, Olive and Green). The Two (2) rotary knobs 16 and 17 marked Heat set the top and bottom heat levels of the grid's range respectively. In this way, the entire grid 21 could be set to the same temperature, a wide or a narrow range as required to suit the overall ambience of the moment. Of the 20 Heat buttons, only one, the last pressed, was active and the entire lighting rig was treated as one; every look contained "programming" for all the fixtures.

The two columns of buttons to the right of the grid 31 and 33 pertained to audio or MIDI stimulation with the ¾ and Tap buttons aiding the proposed automatic Beats per Second (BPS) detection. With Auto selected, the controller would automatically press a new grid button (chosen randomly) at the start of each musical bar (or specified number of bars) with the BPS determining the rate of any dynamic elements within the look. Strobe, Jog Color and Jog Beam allowed the user to accentuate with strobe effects and to jog the look's color preset and beam settings. The Fever Pitch control 35 was an additional expression device that increased the scale of the dynamic elements of the algorithmic programming (larger pan & tilt movements for example) while the Freeze button 38 would halt all dynamic elements within the look while pressed. The overall concept was to allow a user with no lighting knowledge, such as DJ for example, to busk along to the music, triggering appropriate looks to suit the mood and to provide additional forms of lighting expression.

In more recent times the convergence of video and lighting has opened up further pathways for control which have been enthusiastically adopted by lighting designers. This is the use of media servers as a dynamic source of video data. Such devices may output video signals in many formats which are capable of being used, not only by video display devices such as projectors or video walls, but also by lighting instruments where a pixel or group of pixels of the video image are mapped to individual luminaires. This provides the operator with a level of abstraction that greatly aids the task of dealing with thousands of luminaires. As a single video output from a media server can control the output of many luminaires, changing that single video feed may also change the output of the whole lighting rig. Additionally, some media server manufacturers have developed software and control over their products that allows the operator real time control for live performances over content selection and manipulation of either live video or per-prepared media. The Video Jockey (VJ) systems from companies such as Arkaos are good examples of the sophistication of some of these. However, even these systems require extensive set-up by the operator and are limited in their control, autonomy, and expressiveness.

Appendix A provides an example of how the algorithmic color palettes might be defined. Each set was pre-defined to provide a harmonious mix and that provided the system with a wide range of moods. Appendix B provides examples of how the Heat buttons shown in FIG. 2 might be defined as rules.

In more recent times the convergence of video and lighting has opened up further pathways for control which have been enthusiastically adopted by lighting designers. This is the use of media servers as a dynamic source of video data. Such devices may output video signals in many formats which are capable of being used, not only by video display devices such as projectors or video walls, but also by lighting instruments where a pixel or group of pixels of the video image are mapped to individual luminaires. This provides the operator with a level of abstraction that greatly aids the task of dealing with thousands of luminaires. As a single video output from a media server can control the output of many luminaires, changing that single video feed may also change the output of the whole lighting rig. Additionally, some media server manufacturers have developed software and control over their products that allows the operator real time control for live performances over content selection and manipulation of either live video or per-prepared media. The Video Jockey (VJ) systems from companies such as Arkaos are good examples of the sophistication of some of these. However, even these systems require extensive set-up by the operator and are limited in their control, autonomy, and expressiveness.

If we examine the audio side of the entertainment technology world then we see examples of sophisticated synthesizer systems where a composer or operator can create an entire sound field of voices by modifying root level parameters of a sound signal. This technology dates back to the mid 1950's when Harry Olson & Herbert Belar, both at RCA, completed the world's first electronic synthesizer, the RCA Mk 1. This was followed by the formidable RCA Mk II, funded largely by the Rockefeller Institute, which was acquired and installed at the Columbia-Princetown Electronic Music Centre in 1959. A room-sized, vacuum tube device, the RCA Mk II was programmable via a punched paper roll system, and featured a ground-breaking sequencer. It was complicated and unreliable but hugely influential in that it set out the methodology of subtractive analog synthesis that remains popular to this day. In the early 1960s, Don Buchla & Robert Moog independently developed their own synthesizers that were soon heard throughout the popular music, film and TV scores of the 1960s & 70s. Many other manufacturers followed suit and, today, the synthesizer techniques these early pioneers developed are in use every day in music production and live performance.

A fundamental of these audio synthesizer systems was the use of subtractive analog synthesis where a sound waveform is parameterized down to a few simple but powerful controls that the operator then uses. The general idea was to produce a rich audio waveform using one or more oscillators, then filter out harmonics and finally shape the amplitude, all dynamically and in real time, to create a new and interesting sound. The filtering and amplitude shaping leads to the "subtractive" name even though the first stage, creating multi-timbral waveforms, is really an additive process.

The systems provided an array of building blocks that could be connected together as required. Crucially, every parameter of every module could be modulated by the output of any other module or by dedicated sources. Moog devised the logarithmic (and hence musical) Control Voltage (CV) and Gate scheme which eventually allowed even different manufacturers' modules to work together. Programming these machines came down to connecting modules together with patch cords to route the audio and CV & Gate signals.

The standard modules often included the following functions, in order of the usual signal flow:

Audio:

VCO—Voltage Controlled Oscillator: Outputs an audio waveform such as sine, square, triangle, ramp with the CV setting the frequency of the oscillator. The CV was typically derived from a keyboard.

NG—Noise Generator: A white or pink noise source.

MIXER—Mixer: Combines signals, typically the output of VCOs, noise generators and even external sources. Could also be used to mix CVs.

VCF—Voltage Controlled Filter: Attenuates frequencies/harmonics with the CV perhaps setting the cut-off frequency. Various different responses might be included (low-pass, high-pass, band-pass). CV typically derived from an Envelope Generator (EG).

VCA—Voltage Controlled Amplifier: Varies the amplitude of a signal with the CV typically derived from an Envelope Generator (EG).

Modulation:

EG—Envelope Generator: Triggered by the Gate, generated a CV that followed a user-defined path, typically Attack, Decay, Sustain & Release segments (ADSR), that was then used to shape other parameters. The Gate signal was often derived from a keyboard.

LFO—Low Frequency Oscillator: Like a VCO, but operating at low frequency to generate a varying CV to produce, for example, tremolo (when applied to a VCA) or vibrato (when applied to a VCO).

Keyboard: Generally the primary CV & Gate source.

Pitch bend & mod wheels: Performance controls that added musical expression.

Sequencer: Generated a user-defined, repeating sequence of CVs.

Other modules might include Ring Modulators (combined two audio signals to produce interesting sum/difference harmonics), Sample & Hold and other variants. A critical point in the design of such systems was that any module could be connected to any other module, so the scope for original synthesis was huge. Furthermore, the controls were tactile & immediate, so opportunities for expression and experimentation abounded. This is why, even with powerful digital techniques available, these synthesizers remain popular today.

FIG. 3 illustrates a common arrangement of these audio synthesizer modules and shows the audio, CV 30 and Gate 32 signal paths from module to module. FIG. 3 also illustrates the progression of the audio signal 34 from module to module. The user interface is comprised of the keyboard 40, and mod and pitch wheel 42 and 44 respectively. The system shown shows an LFO 46 serving the pitch 44 and/or Mod 42 wheels. The system shown employ a NG 48 and two VCOs 50 and 52 that are triggered by the keyboard 40. The VCOs and NG send audio signals to a Mixer 54.

The audio signal output by the Mixer 54 is further processed by VCF and VCA modules 56 and 58 respectively supported by modulation provided by respective EGs 60 and 62 respectively.

FIG. 4 illustrates the CV output commonly seen from the ADSR stages of an EG module. For example in FIG. 3 EG2 62 CV output 64. Note that three of the parameters—A (Attack), D (Decay), and R (Release), are times whereas the S (Sustain) parameter is an output level. If an EG module 62 were being driven by a keyboard then the sequence may be as follows.

a. Key is pressed—Output from EG rises 70 over the 'Attack Time', A, to an initial maximum.

b. Key is held—Output drops 72 from initial maximum over the 'Decay Time', D, to a level 74 defined by the 'Sustain Level', S.

c. Key continues to be held—Output remains 76 at 'Sustain Level', S.

d. Key is released—Output drops 78 back to zero over the 'Release Time', R.

As well as audio synthesizers, we also find video synthesizers to be commonly used in video and television production. These initially followed a similar strategy to audio synthesizers in that the operator controls multiple, low level, inputs which taken together combine to produce a complex output. Video synthesis is a different process to CGI (computer generated imagery) and has become the preserve of video artists rather than television or video production companies and the development has culminated in performance tools such as the GrandVJ from Arkaos.

None of these synthesis techniques have been applied to lighting control in a manner that would allow the combination of mood control and algorithmic programming within the constraints of automated lighting and pixel mapped video. Thus there is a need to expand and improve on the ideas and concepts used in both audio and video synthesizers and to apply them to be used in a system for controlling lighting and video. In particular relating to synthesizing a dynamic lighting configuration in a live environment in response to user input and environmental conditions.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention generally relates to a method for controlling lighting and video, specifically to methods relating to synthesizing a dynamic lighting configuration in a live environment in response to user input and environmental conditions.

Figure 1:
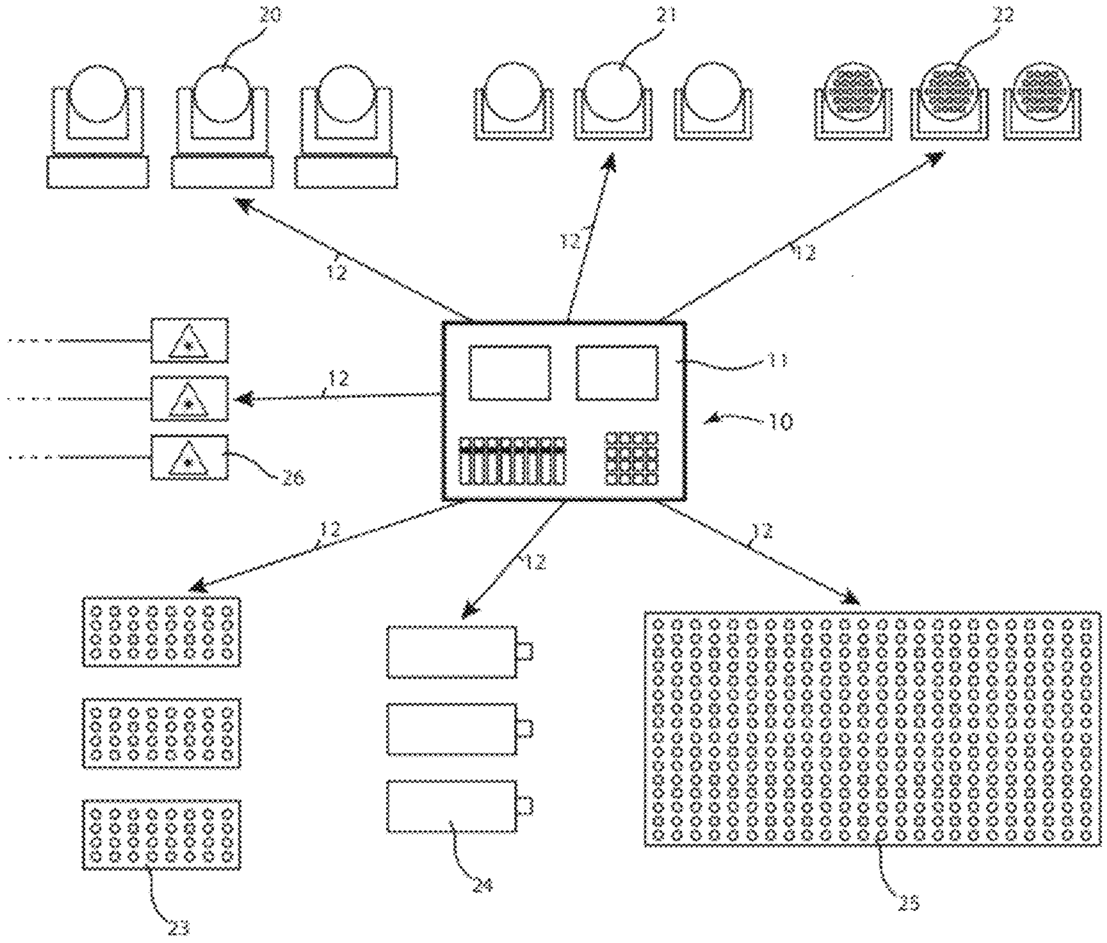
FIG. 1 illustrates a typical lighting system.
Figure 2:
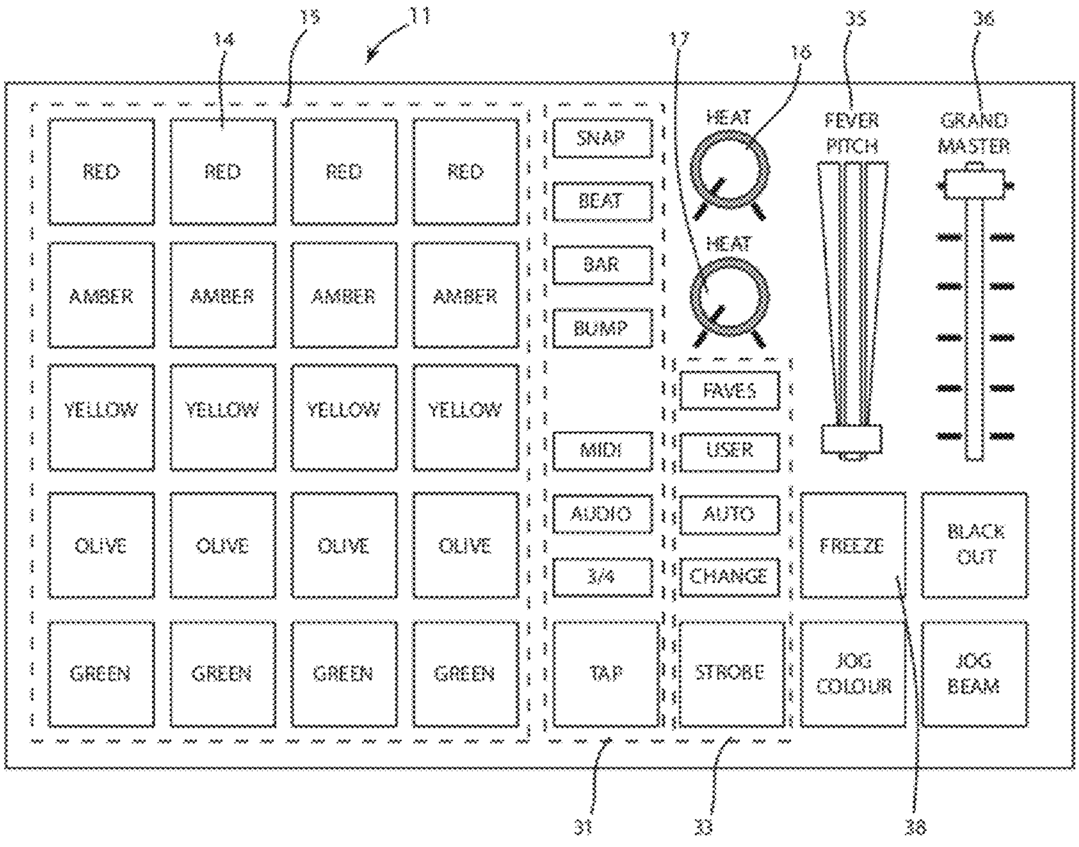
FIG. 2 illustrates an example of a prior art algorithmic lighting control system.

The disclosed invention provides a parameter driven synthesizer system to generate lighting and video effects within the constraints of automated lighting equipment and pixel mapped video systems as illustrated in FIG. 1. It is designed to interface with all commonly used lighting instruments in the same way as the prior art systems. The invention imparts no special requirements on either the controlled luminaires or the data links to those luminaires so may be used as a direct replacement for prior art control systems.

Figure 5:
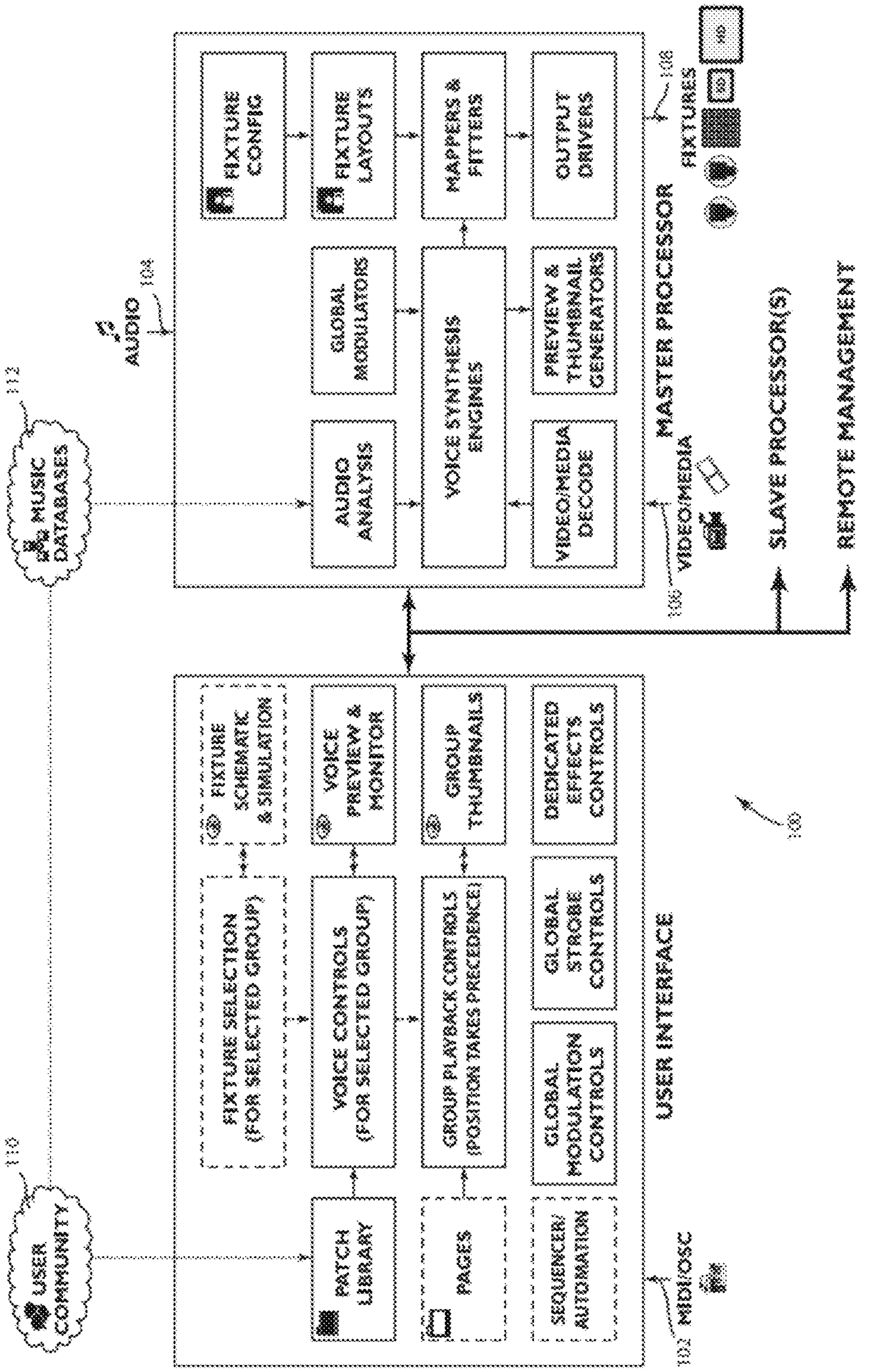
FIG. 5 illustrates a generic systems diagram of a visual synthesizer control system for an embodiment of the invention.
Figure 12:
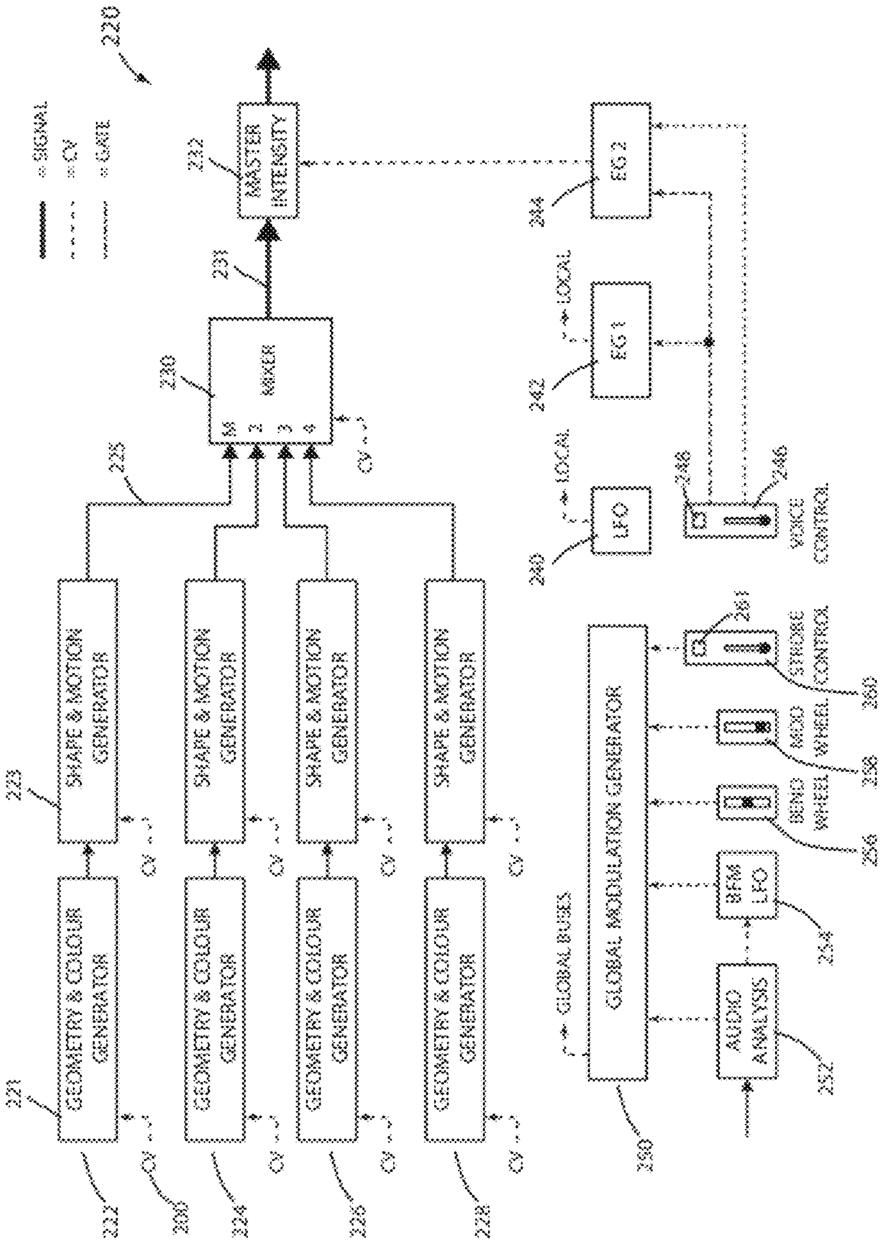
FIG. 12 illustrates a voice of an embodiment of the invention.

FIG. 5 illustrates a generic system diagram of an embodiment of the invention. The left side of the diagram indicates possible modules for the user interface, while the right side shows possible processing modules. The details of which are disclosed in later sections of this specification. In particular FIGS. 14-27 illustrate examples of the user interface embodiments of this system diagram. FIG. 12 illustrates examples of processing modules including but not limited to: the geometry and color generators, shape and motion generators, and envelope generators described in greater detail below.

FIG. 5 also shows how the system may connect to external devices such as MIDI 102, Audio 104, and Video/Media inputs 106 as well as output 108 to Fixtures. The system may also connect to external cloud based resources such as the user community 110 and music databases 112.

One key feature of the invention is the use of mapping techniques to abstract the control of lighting parameters to fundamental variables that may then be controlled automatically by the system.

Spatial Mapping.

The prior art commonly uses a technique called "pixel mapping" for luminaires where a pixel or group of pixels in a video image is mapped to a specific luminaire that is in a corresponding position in the lighting rig. It is commonly used, as described earlier, to aid programming large lighting rigs as complete video images may then be overlaid over a complete lighting installation with one image controlling many lighting fixtures. Rather than pixel Mapping, the present system employs spatial mapping. Unlike traditional pixel mapping, Spatial Mapping is an improvement on the art in that, instead of mapping an image to the physical fixture array as you would with an array of luminaires or with an LED screen, the present system maps to an abstracted canvas onto which the fixtures project.

Figure 6:
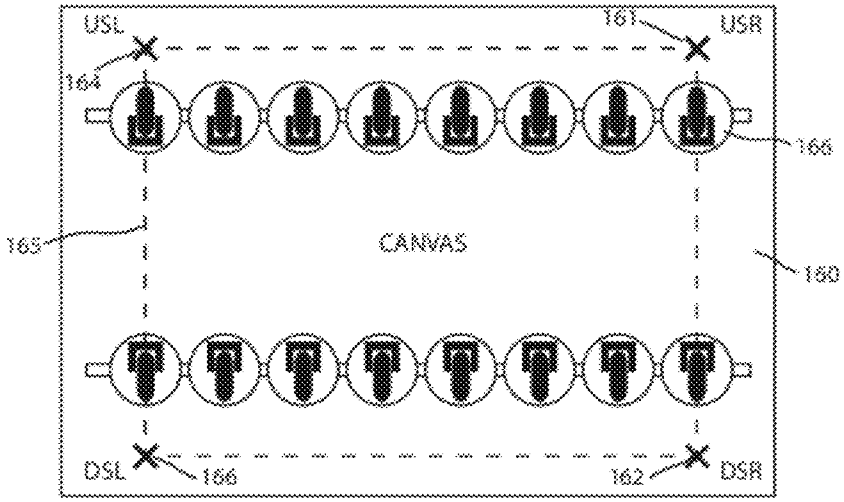
FIG. 6 illustrates a spatial mapping system of an embodiment of the invention.

The canvas can setup using a 3D system that is well known in the art and utilized by existing lighting consoles. During configuration of the invention, the user calibrates and stores the coordinates of four points as the corners of the canvas. Once these corner points have been defined the synthesizer can then refer to the coordinates and accurately position the automated lights or projectors as required to produce an image on the canvas. FIG. 6 illustrates a simple example of the canvas and spatial mapping. FIG. 6 shows a top-down plan view of a performance space 160 with 16 automated luminaires 166 mounted above the canvas 165 which is defined in this example by four corner points 161, 162, 163, and 164. In this example, using conventional theatrical terminology, 161 is Up Stage Right, 162 is Down Stage Right, 163 is Down Stage Left and 164 is Up Stage Left. Once the three-dimensional coordinates of these four points are stored within the invention it may then position automated lights 166 within the space bounded by them and thus paint on the canvas.

Figure 7:
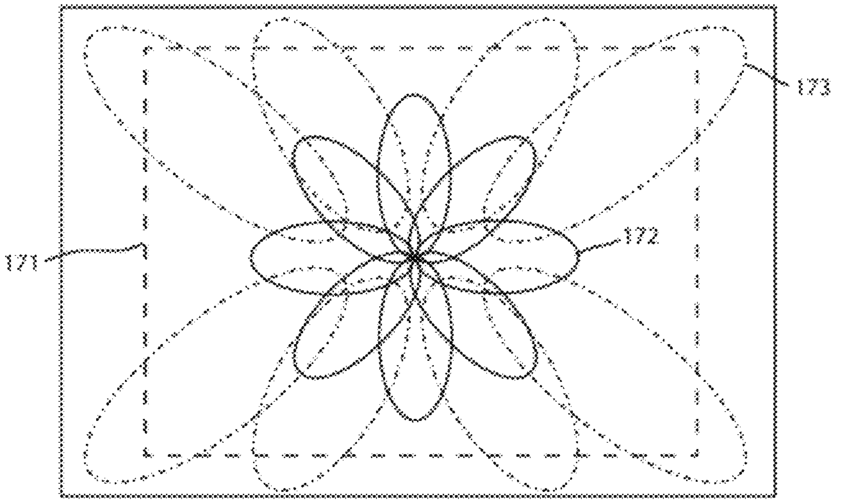
FIG. 7 illustrates a spatial mapping system of an embodiment of the invention.

FIG. 7 illustrates an example of this painting on a canvas 171 like the canvas 165 in FIG. 6. FIG. 7 illustrates a top-down view of luminaire projected images 172 173 within the canvas 171.

Figure 8:
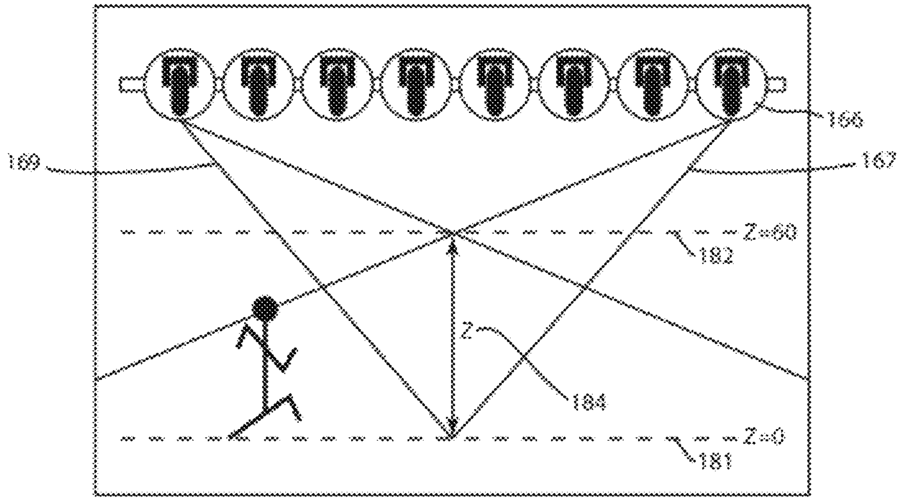
FIG. 8 illustrates a spatial mapping system of an embodiment of the invention.

FIG. 8 illustrates a front elevation view of luminaires 166 painting the canvas 181 (like canvas in FIG. 6 and FIG. 7 165 and 171 respectively) with light beams 167 169.

FIG. 8 also illustrates a benefit of the abstraction of the canvas. The abstracted canvas need not be fixed. For example in FIG. 8 the canvas 181 can be repositioned. FIG. 8 illustrated the canvas being repositioned vertically from 181 to 182. A distance of z. While FIG. 8 illustrated moving the effective floor level from a floor level position 181 to an elevated position 182 by altering one of the three-dimensional parameters: the z parameter. In alternative embodiments, other parameters of the canvas may be altered. Additionally, in alternative embodiments, canvas parameters can also be modulated as further described below with respect to procedural mapping. Using FIG. 8 as an example modulation in the canvas's z parameter effectively moves the canvas towards or away from the fixture array 166 so changing, in real time, the beam angles (pan/tilt) and beam size (iris/focus/zoom) to yield expressive effects in both the projected images or beam splash and beam effects in the air.

Procedural Mapping.

The disclosed invention extends and improves the concepts of low level procedural mapping utilized in audio synthesizers to be used for lighting and visual synthesis. This provides a logical, unified and abstracted performance interface that has no concern or regard for the actual physical lighting fixtures. Unlike the prior art systems where the user must have an intimate knowledge of the capabilities and limitations of the luminaires they are using, a user of the disclosed invention need know nothing about lighting or the specific capabilities of the connected units to use the abstracted control.

Figure 3:
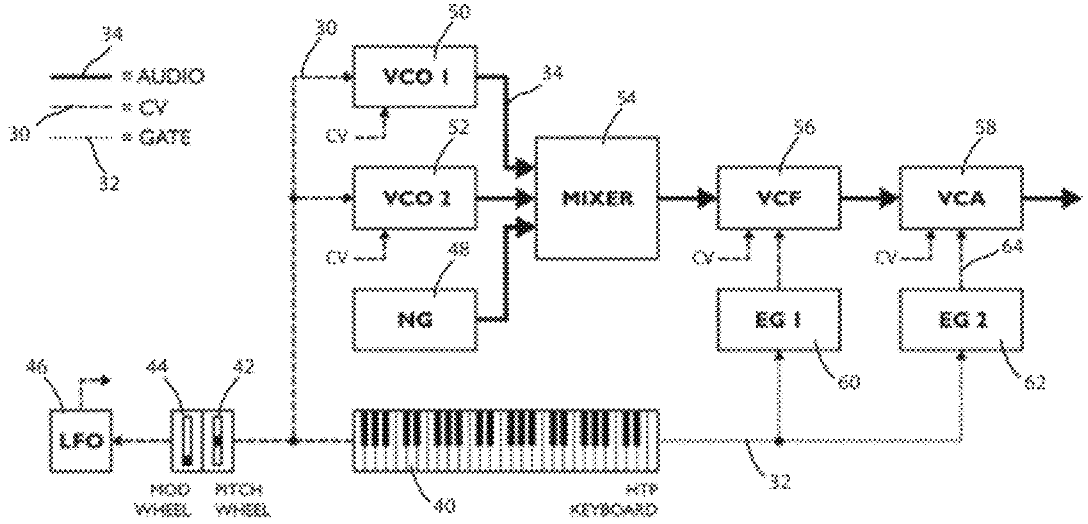
FIG. 3 illustrates a prior art arrangement of audio synthesizer modules.
Figure 4:
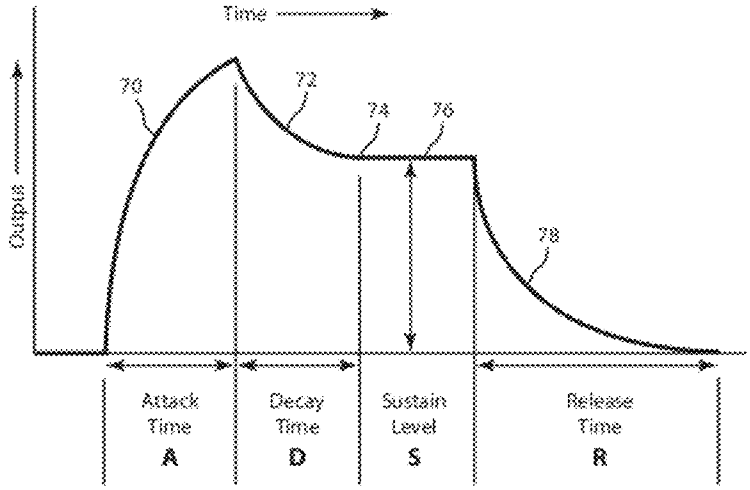
FIG. 4 illustrates the operation of an EG modulation module.
Figure 9:
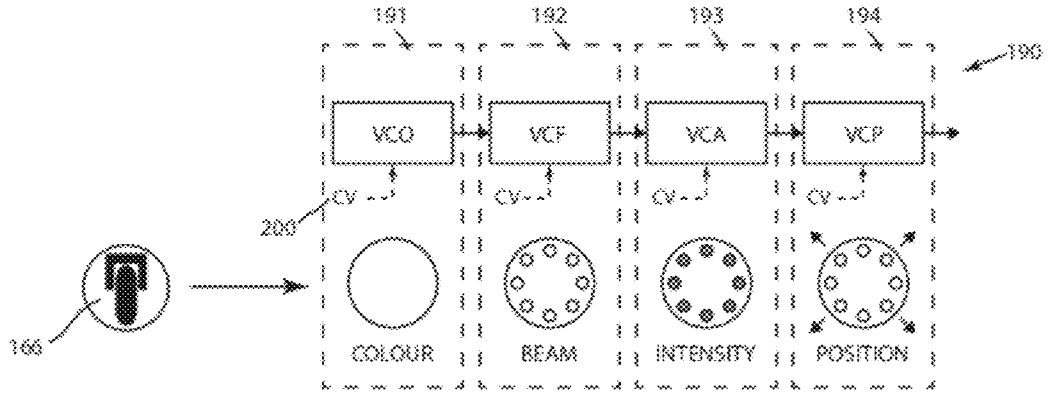
FIG. 9 illustrates a procedural mapping system of an embodiment of the invention.

The invention maps the procedures for synthesis with automated lights, which may be grouped to operate on a canvas, to video screens and to LED arrays grouped to constitute a canvas. For example, an automated luminaire may be described in audio synthesis terms as shown in FIG. 9. Automated luminaire 166 may have a color function that is analogous to a VCO (Voltage Controlled Oscillator) in an audio synthesizer 191, a beam pattern function that is analogous to a VCF (Voltage Controlled Filter) 192, an intensity function that is analogous to a VCA (Voltage Controlled Amplifier) 193, and a positional function that is analogous to VCP (Voltage Controlled Pan) 194. As with an audio synthesizer these modules may be cascaded with each module operating on the output of the last 190. As can be seen, automated luminaires may be treated as analogous with audio synthesizers with a patch that is almost identical to the simple audio synthesizer shown in FIG. 3. Automated profile lights may also offer gobo/prism rotate and zoom/iris as part of their beam functions which add motion capabilities beyond simple pan & tilt positional movement control.

Figure 10:
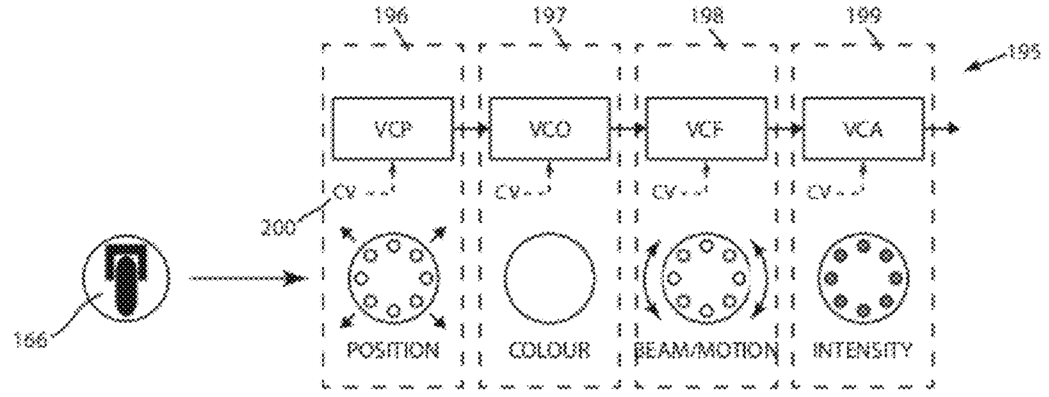
FIG. 10 illustrates a procedural mapping system of an embodiment of the invention.

The label CV 200 on all figures indicates Control Voltage (CV) input to a module. The term CV is a legacy term used in prior art audio synthesizers but does not restrict the signal type to a simple DC voltage. A CV signal may be an analogue or digital signal of any kind known in the art. Examples may include but not be restricted to: serial digital data, parallel digital data, analogue voltage, analogue current. The signal protocol or encoding may be in any means well known in the art including, but not restricted to: PWM, FM, DMX512, RS232, RS485, CAN, RDM, CANbus, Ethernet, Artnet, ACN, MIDI, OSC, MSC. The value of the CV parameter may come from a user interface through devices well known in the art including but not restricted to; fader, rotary fader, linear encoder, rotary encoder, touch screen, key pad, switch, push buttons. A value for the CV parameter may also be provided through any of the following routes, which may use any of the signal protocols listed above:

1. A data path from a stored and retrieved value
2. The parameterization of an audio signal such as music or noise input through a microphone or other audio signal path.
3. A value from an algorithm within the lighting console, including random values.
4. The output of another module within the lighting console.
5. A value from a connected external device such as a second lighting console or a MIDI keyboard.
6. A value from a connected smart phone or other similar device such as an iPhone or iPad.
7. A value from a web page or web app sent through the internet.
8. A signal from a video camera, which may be a depth sensing video camera.
9. Other signal routes or generating devices as well known in the art FIG. 9 illustrates a very specific procedural mapping whereas FIG. 10 shows how the mapping process may be generalized to encompass all automated luminaires. In this example a generic automated luminaire 166 has position (VCP) 196, color (VCO) 197, Beam/Motion (VCF) 198, and Intensity (VCA) 199 parameters, re-ordered into a more intuitive definition 195. In other embodiments other pairings of parameters to modules are possible. Further in these and other embodiments, the cascading of modules can be reordered.

Figure 11:
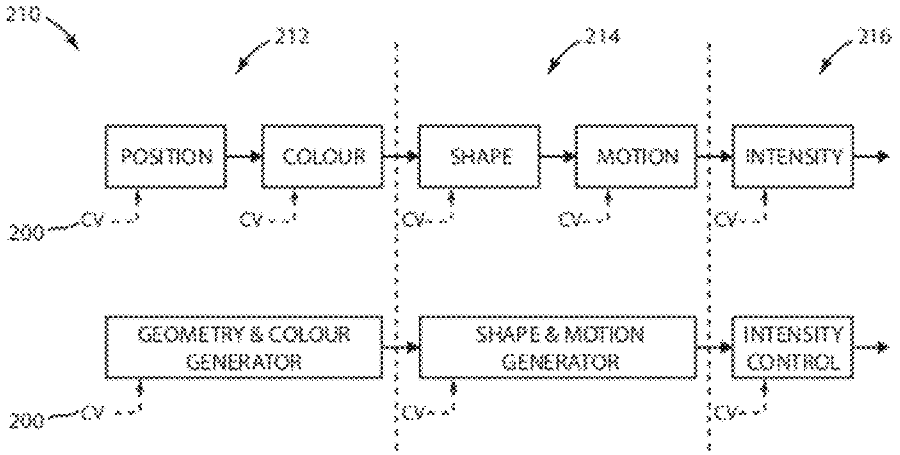
FIG. 11 illustrates a procedural mapping system of an embodiment of the invention.

FIG. 11 further abstracts these concepts and illustrates how each individual luminaire, or group of luminaires, can become a painter on the canvas with control from various synthesized control generators. The visual synthesis engine 210 has thus been organized into 2 exemplar generator modules 212 and 214, and intensity control 216:

Geometry & Color Generator (GCG).

This module determines how the group's canvas is filled with color. Color gradients and color modulation or color cycling may be supported with the color fill's type and focal point definable and subsequently determining any shape placement and motion. Colors may be specified and processed using the Hue, Saturation & Brightness (HSB) model with brightness controlling transparency depth (100% is opaque, 0%, is fully transparent). The system may map HSB values to any desired color system for control of the connected devices. For example, it may be mapped to RGB for pixel arrays and to CMY for subtractive color-mixing automated lights. Additionally, automated lights with discrete color systems using colored filters instead of color mixing may be mapped using a best fit based only on the Hue and Saturation values. Brightness may be ignored so that the intensity parameter will not be invoked by the color system. Colors may further be set to come "From file" or "From input" to import media clips or live video respectively to be incorporated into the geometry as required. This would allow the system to provide a gradient fill color from the media to a specified color. Media clips may automatically be looped by the system.

Shape & Motion Generator (SMG).

This module effectively overlays a dynamic transparency mask which models a pattern projecting luminaire. Various analogies can be made between video and lights, for example: shape< >gobo(s)/prism, size< >zoom/iris and edge-blend< >focus. Thus it is possible to map simple shapes including but not limited to points, lines, and circles to pattern projecting luminaires with control over size and edge-blend. Depending on the feature set of the automated luminaires, further mappings from video functions may also be possible so as to use the full feature set of the luminaire. The chosen projected shapes are placed on the canvas according to the geometry specified in the preceding Geometry & Color Generator module. Multiple SMG modules may be combined to create complex, kaleidoscopic arrangements, particularly with pixel array devices. Automated lights are more limited and can often only project a single shape, although some internal optical devices such as gobos and prisms may offer scope for multiple shapes from a single luminaire.

Once a shape is defined its motion can then be generated in at least two ways:

Transforming.

Moving the shape's centre relative to either its initial seed position on the canvas defined by the GCG, or relative to the focal point of the canvas geometry. A special case may be a uniform fill of the canvas which has neither focal point nor motion.

Morphing.

Rotating and/or re-sizing the shape about its current centre position as transformed (for example by using gobo/prism rotation and/or zoom/iris). A combined shape on a pixel array may morph as if it were a single image.

In both cases an important motion parameter is trails, whereby any motion leaves behind it an afterglow of its previous position, the amount of decay in the trail is variable. A decay setting of zero would create a persistent trail. This concept can also be reversed so that the trails perform the motion while the shape remains stationary. Each motion type may have separate trail parameters.

More complex, algorithmic shapes include but are not limited to Lissajous curves, oscilloscope traces and spectral bar graphs. Shapes can further be imported from external files as monochrome or greyscale media clips. These could be applied as a single mask with inherent motion. It is possible to invert the mask and to loop the clips. Multiple GCG and SMG modules may be connected in any desired topology with each module modifying the signal and passing it to the next module. There may also be feedback such that a module provides parameters for previous modules in the chain.

A fully featured GCG and SMG may require a large number of operational controls, some of which may be redundant at any particular moment based on the settings of others. This is clearly wasteful, confusing and ultimately restrictive in that the choices would effectively be hard wired into the user interface. In order to reduce the complexity of the user interface, the modules may use presets that are configurable via a fixed number of soft, definable, controls whose function will vary depending on the current configuration.

GCG and SMG Presets may be authored using a scripting language with the system holding a library of scripts. Such scripts may be pre-compiled to ensure optimal performance. Over time, new presets may be developed both by the manufacturer, user and by others and could be shared through known web-based and forum distribution model.

The system may also support Installer Presets, created using the configuration software, to handle specific, non-synthesized requirements unique to the installation. Examples of such venue specific presets might include; presets for aiming automated lights at a mirror ball, rendering corporate logos or switching video displays to a live input for advertising or televised events. These presets may typically have no configuration or modulation controls and may be packaged into protected, read-only Installer Patches. Other presets may also be employed.

Grouping & Precedent

The installer of the system may create lighting groups using a configuration application as previously described. Once configured, the grouping is fixed, with the positional order of the groups determining the precedent in cases where fixtures belong to more than one group. In prior art video and lighting controllers precedence is normally determined by either a Highest-takes-precedence (HTP) logic or a Latest-takes-precedence (LTP) logic, or a mixture of both. The logic chosen will determine what the controller should output when a resource (fixture) is called upon at playback to do two or more things at once, i.e. which command takes precedence. Neither scheme is well suited to visual synthesis, instead a Position-takes-precedence (PTP) scheme is proposed whereby it is the physical position of the control or fader, in relation to other controls or faders, that determines precedence. For example, in one embodiment of the invention, a control or fader will take precedence over all controls or faders that are positioned to the left of the current control. In this case the PTP is a Right Takes Precedence as the rightmost control will prevail. In this case a fixture that may be a member of multiple groups is only ever controlled by one group, the rightmost active group. This is hugely advantageous in a number of regards:

It is simple and easy to grasp by an untrained user not versed in the art (a DJ in a nightclub for example).

The controller's output can be directly inferred from the current group status.

It provides a simple scheme for a default state (leftmost group) through to a parked state (rightmost group).

It removes temporal ambiguities, the time order of events is irrelevant, only their position matters.

It allows the controller's output to be recorded for subsequent, reliable recall via a simple sequencer.

It is ideal for fixed installations where group membership and precedence can be defined and then locked by the installer with the rightmost group(s) providing management override(s) for life safety conditions and venue specific requirements.

Voice(s).

While a single GCG+SMG layer may be adequate for an automated light group due to the inherent constraints of the instruments, pixel arrays and video devices have no such constraints and so will benefit greatly from multiple layers. The invention allows overlaying any number of layers of GCG+SMG modules to form a voice.

Prior art video and lighting controllers are typically programmed by the user at the lighting fixture level requiring specific knowledge of the functionality of the fixtures used. This requires the user to determine which fixtures to use prior to programming, the fixture choice is thus committed and subsequent changes typically involve significant time in editing which inhibits creativity and stymies experimentation. However, in an embodiment of the invention, once GCG and SMG Mapping is in place, real time synthesis can be applied to one or more Abstracted Groups (Voices) with no regard at all to group membership; the synthesis is rendered at playback. This is advantageous in a number of regards:

Creative intent can be expressed without having to commit in advance to fixture choices Creative intent can be maintained from venue to venue with different fixture choices Group membership can be changed in real time and the synthesis will seamlessly adapt Such group membership changes can be either prescriptive (the user specifically changes the membership) or reactive (the membership is changed at playback in response to other group(s) activity/inactivity as determined by a precedence scheme).

An example of a complete voice 220, comprising 4 layers 222, 224, 226, 228 and associated modulation resources (for layer 222 modulation module resources 221 and 223) is illustrated in FIG. 12. Although 4 layers are herein described, the invention is not so limited and any number of layers may be overlaid within a voice. Each of the four layers 222, 224, 226 and 228 contains its own GCG and SMG modules and the output (for layer 222, modulation module resources 221 and 223 and output 225) of each layer is sent to a single mixer 230 which combines them into a single output 231. The combined output 231 may be provided to a master intensity control 232. The modules illustrated in FIG. 12 perform the following functions.

Mixer.

The mixer 230 serves two purposes: to combine the output of the 4 layers and to provide intensity modulation (such as chase effects) to the main layer 222, primarily for automated light groups. Layers 2 thru 4 224, 226, 228 may be built up upon the main layer 222 in succession with user controls available to set the combination type, level, and modulation. Combination types may include, but are not restricted to: add, subtract, multiply, or, and, xor.

Local Modulation.

Each voice may have its own Low Frequency Oscillator (LFO) 240 and envelope generators (EG1 242 and EG2 244). EG2 may be dedicated to master intensity control 232. Manual controls may include a fader 246 and flash/go button 248, the latter providing the gate signal for the two EGs 242 244.

Master Intensity.

Master intensity provides overall intensity control and follows the output of EG2 244 and the fader 246, whichever is the highest. Pressing and holding the flash/go button 248 may trigger EG2 244 and the intensity may first follow the ADS (Attack, Decay, Sustain) portion of the EG2 244 envelope and then the R (Release) when the button 248 is released.

Global Modulation Generator:

In the embodiment shown the Global Modulation Generator 250 is not part of a specific voice but a single, global resource shown for completeness. This provides modulation sources that may include but are not limited to; audio analysis 252 of various types, divisions/multiples of the BPM-tracking LFO 254, performance controls such as modulation & bend wheels 256 and 258 respectively, and strobe override controls 260 and 261.

A voice as described could synthesize more than one group each containing luminaires of a different type, for example wash lights on the main layer and profile lights on the second layer. However, this would require a fixture selection scheme and knowledge of the fixtures which the abstracted user interface does not possess. A preferred embodiment of the invention therefore restricts groups to only contain fixtures of the same capability.

Examples where fixtures might be members of more than group include:

Automated lights used to light more than one area (canvas), dance floor and stage for example. In this case the stage group(s) (which might contain some or all of the dance floor fixtures) would be placed to the right and so are of higher precedence.

LED arrays and video screens could be grouped in different ways to provide alternate mapping options (different canvases). A large array, then smaller arrays through to individual video screens may be progressively laid out left to right. Video screens would thus be placed to be of the highest precedent for Installer Patches to override correctly.

Voice Patches.

The configuration to create a voice may be stored and retrieved in voice patches. Voice patches record all the voice settings including, for example: loaded Presets, control settings and local modulator settings. A voice patch is analogous to audio synthesizer patches and may be created and edited on the system itself. Patches are totally abstracted from the specifics of the connected luminaires or video devices and can be applied to a voice without regard to the instruments grouped to that voice. No prior knowledge of video/lighting fixtures is required to produce interesting results via the user interface.

An embodiment of the invention may ship with a library of pre-programmed Patches organized into "mood" folders. Users may create and share their own Patches to enhance this initial library. Users may also develop and share GCG and SMG Presets for use with their Patches (and then by others for new Patches). In this way the invention will leverage the creativity of the user base to develop Patches and categorize moods to be shared by the user community. As already noted the installer may also create protected, read-only Installer Patches to handle special requirements unique to each installation such as corporate branding, televised events and advertising.

Polyphony.

Figure 13:
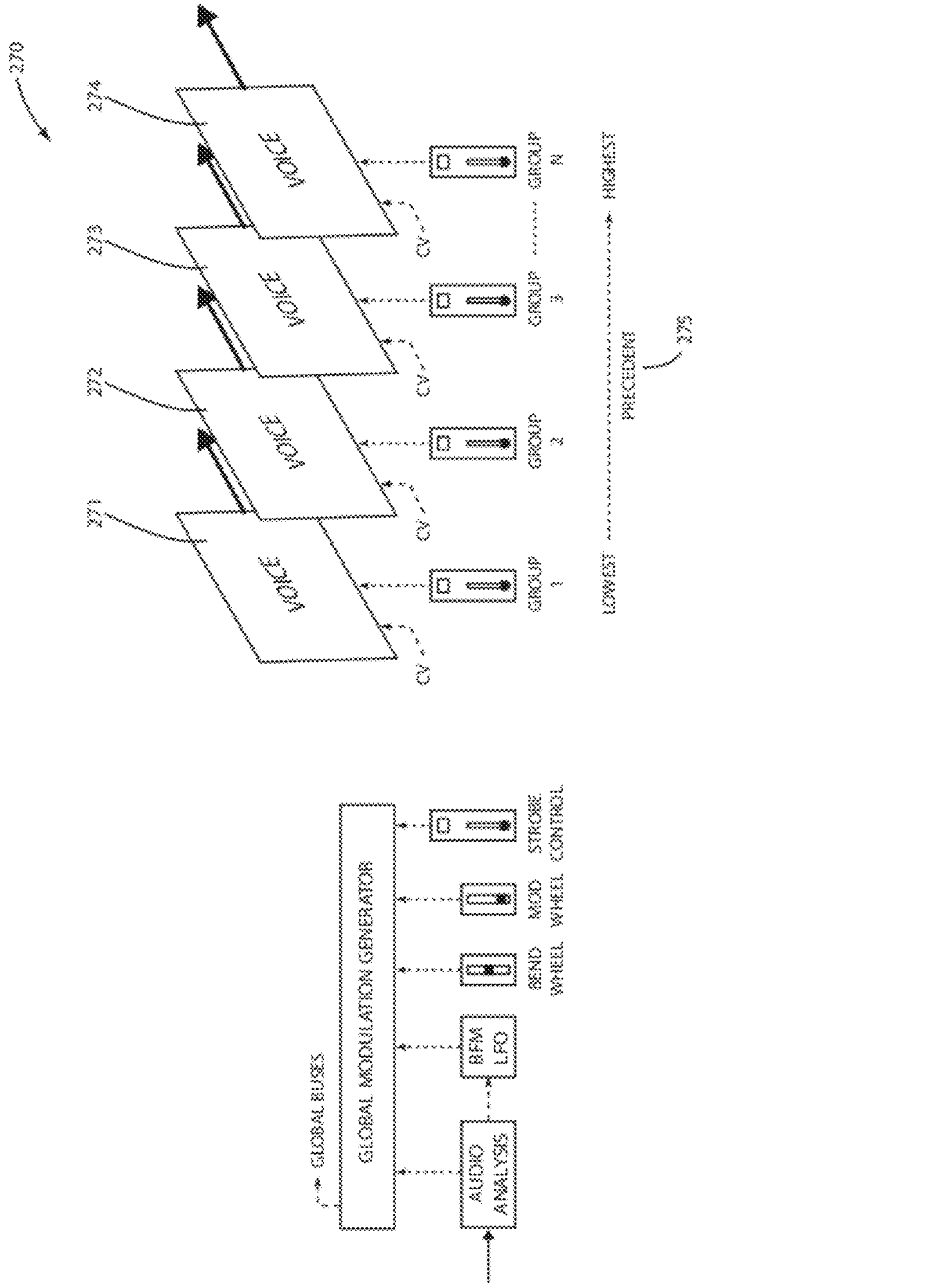
FIG. 13 illustrates polyphonic voices of an embodiment of the invention.

Unlike an audio synthesizer or media server, the disclosed invention demands multiple outputs, one for each useful grouping of lighting and video instruments in the installation. The user may therefore invoke multiple voices, one for each group as defined by the installer, and as many as are required limited only by the user interface. The disclosed system is thus truly polyphonic in that each and every group can sing with a different voice. FIG. 13 illustrates the principle with N voices assigned to lighting groups 1 through N.

FIG. 13 illustrates an embodiment of the light system synthesizer 270 where multiple groups 1 through N 271, 272, 273, 274 are arranged from left to right in a Right precedence PTP system 275 such that group 2 272 takes precedence over group 1 271, group 3 273 takes precedence over group 2 272 and so on, moving left to right, until group N 274 takes precedence over voice N−1.

Loading & Editing Patches.

Unlike the real time retrieval and loading of GCG & SMG Presets, and voice control, the retrieval and loading of a Patch only takes effect when the group's flash/go button 276 is pressed, with the incoming Patches' EG settings determining the transition from one voice to another. In this way the operator can preview Patches without making them visible "on stage", and set up multiple groups to load new Patches simultaneously. To facilitate this functionality in some embodiments, a "go all" button may be provided. Patches can only be edited when loaded onto a group and the group selected.

Velocity and Pressure Sensitive Controls.

In prior art lighting control devices the controls are not velocity sensitive and the result will always be the same no matter whether the operator moves them slowly or quickly. In an embodiment of the invention however, any of the control types may operate in a mode where they behave with velocity sensitivity and the end result will be dependent both on which control is operated and the speed at which it is operated.

For example, moving a fader slowly may trigger one effect or change while moving it quickly may trigger another. Perhaps moving it slowly will fade the lights from white to red, while moving it quickly will do the same fade from white to red, but with a flash of blue at the midpoint of the fade. Alternatively, moving it quickly may do the same fade from white to red but will increase the intensity of the light proportionally to the speed that the fader is moved. This velocity sensitive operation of faders may be achieved with no physical change to the hardware of the fader, velocity information may be extracted from the operation of rotary controls such as encoders. It may also be extracted from the movement of the operator's finger on touch sensitive displays. In both cases no change to the hardware may be required.

For push buttons a hardware change may be necessary in order to make them capable of velocity sensitive operation. Such operation may be achieved in a number of manners as well known in the art, including, but not limited to, a button containing multiple switch contacts, each of which triggers at a different point on the travel of the button.

In a further embodiment of the invention controls may also be responsive to pressure, sometimes known as aftertouch, such that the speed with which a control is operated, and the pressure which it is then held in position, are both available as control parameters and may be used to control or modulate CV values or other inputs to the system.

The velocity and aftertouch information may be used to control items including but not limited to the lighting intensity, color, position, pattern, focus, beam size, effects and other parameters of a group or voice. Additionally velocity and aftertouch information may be used to control and modulate a visual synthesis engine or any of the CV values input to modules.

In further embodiment of the invention, velocity and aftertouch information may be available to the operator as an input control value that may be routed to control any output parameter or combination of output parameters. The routing of the control from input to output parameter may be dynamic and may change from time to time as the operator desires. For example, at one point in a performance the velocity information of a control may be used to alter the intensity of a luminaire while at another point in a performance the same velocity information from the same control may be used to alter the color of a luminaire.

Audio and Automation.

It is well known for lighting control systems to be provided with an audio feed, perhaps from the music that is playing in a night club, and then to perform simple analysis of the sound in order to provide control for the lighting. For example, 'sound-to-light' circuitry where an audio signal is filtered to provide low frequency, mid frequency, and high frequency signals each controlling some aspect of the lighting. Similarly the beat of the music may be extracted from the audio signal and used to control the speed of lighting changes or chases. It is also common to control lighting and video systems through MIDI signals from musical instruments or audio synthesizers. The invention improves on these techniques by optionally providing full tonal analysis where the musical notes are identified and can be assigned to lighting moods or CV parameters for any of the modules in the lighting console. In further embodiments the invention may utilize song recognition techniques, either through stand-alone algorithms in the console itself, or through a network connection with a remote Internet library such as that provided by Shazam Entertainment Limited. Through such techniques the precise song being played can be rapidly identified, and appropriate lighting and video patches and parameters automatically applied. These routines may be pre-recorded, specifically for the recognized song, or may be based on the known mood of the song. Users of the invention may share their recorded parameters, patches, and control set-up for a particular song with other users of the invention through a common library.

Figure 14:
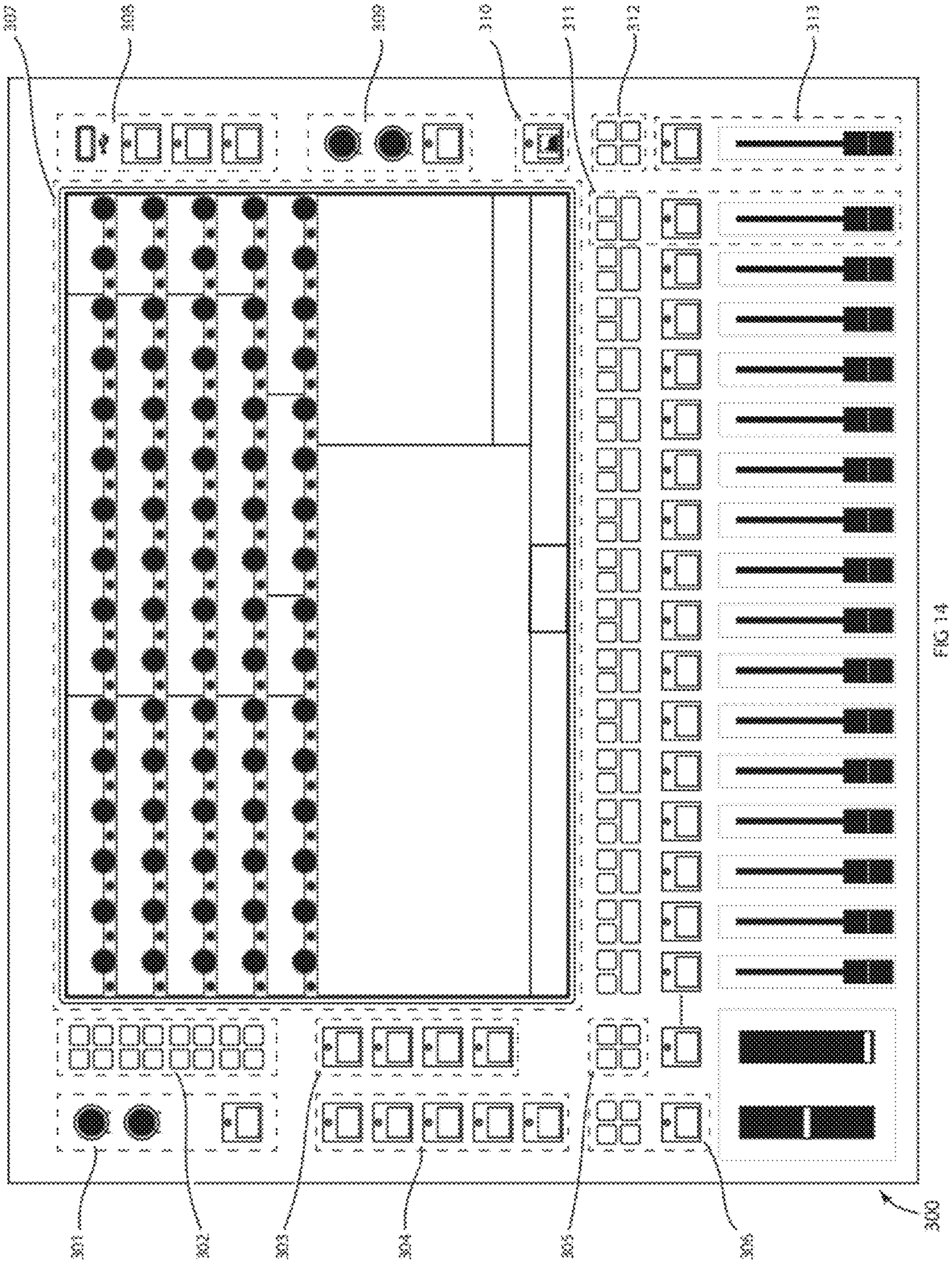
FIG. 14 illustrates a user interface of an embodiment of the invention.

FIG. 14 illustrates a sample user interface 200 of an embodiment of the invention which may contain the following elements shown in greater detail in FIGS. 15-27.

Figure 15:
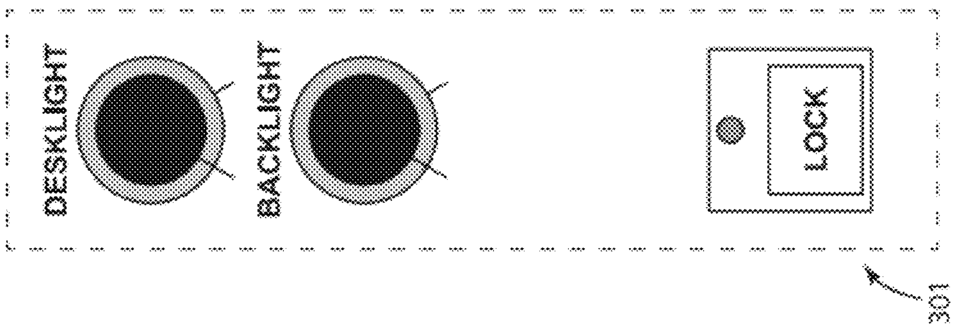
FIG. 15 illustrates detail of FIG. 14.

301—Shown in detail in FIG. 15—User interface controls. For example, desklight brightness, LCD backlight brightness and controls to lock and unlock the interface.

Figure 16:
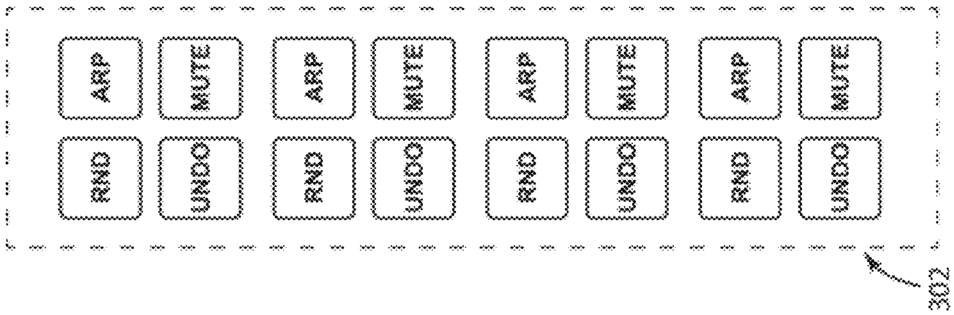
FIG. 16 illustrates detail of FIG. 14.

302—Shown in detail in FIG. 16—Voice layer controls. Overall controls for a voice layer, for example buttons to randomize settings, undo the last settings change, enable an arpeggiator and to mute this voice layer. An arpeggiator is a known term of the art in audio synthesis and refers to converting a chord of simultaneous musical notes to a consecutive stream of those same notes, usually in lowest to highest or highest to lowest order. The analogy when applied to lighting or video in an embodiment of the invention refers to converting simultaneous changes members of a group into a chase or sequence of those changes. For example, a change in color from red to blue of a group will normally result in the simultaneous color change of all group members; however an arpeggiator change will change each member of the group from red to blue in turn, one after the other. Arpeggiator controls may allow the control of the timing, overlap and other parameters of the changes in a manner similar to a chase effect on a lighting control console.

Figure 17:
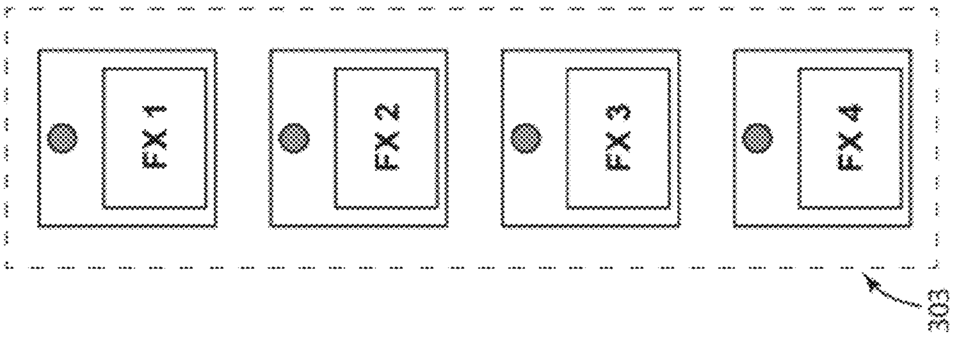
FIG. 17 illustrates detail of FIG. 14.

303—Shown in detail in FIG. 17—Switched Effects. Undedicated controls that may be assigned to any connected device that is not part of a voice, such as a UV light source or other special effects device.

Figure 18:
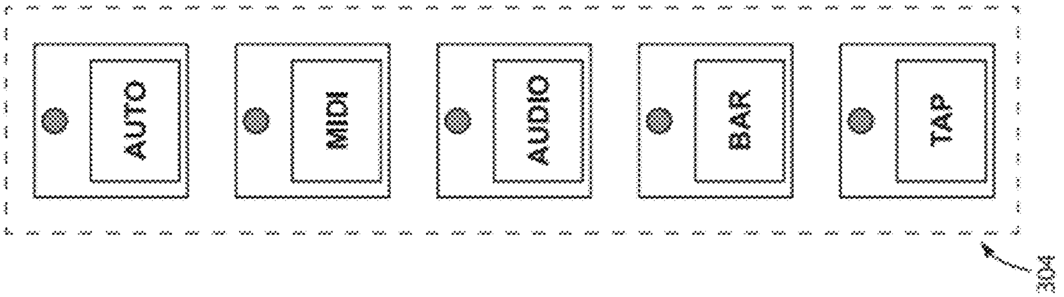
FIG. 18 illustrates detail of FIG. 14.

304—Shown in detail in FIG. 18—Automation Controls. Overall controls for automation of the console operation, for example, Automatic operation on/off, MIDI control on/off, Audio control on/off, and Tempo and On-Bar musical control on/off.

Figure 19:
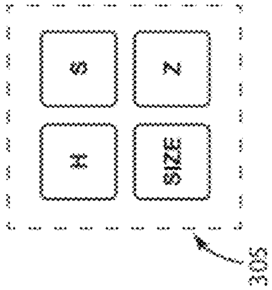
FIG. 19 illustrates detail of FIG. 14.

305—Shown in detail in FIG. 19—Modulation Wheel Routing. Allows assigning the modulation wheel to different parameters, for example Hue, Saturation, Motion size and Z.

Figure 20:
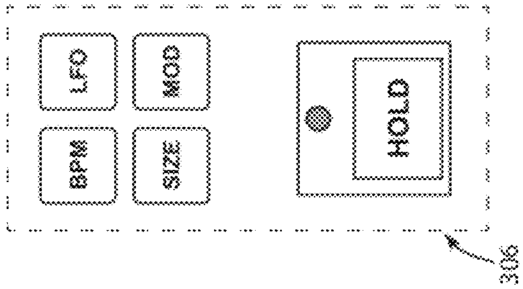
FIG. 20 illustrates detail of FIG. 14.

306—Shown in detail in FIG. 20—Bend Wheel Routing. Allows assigning the bend wheel to different parameters, for example BPM LFO (Beats per minute), Voice LFO, Motion size, Modulation depth, and the ability to Hold the value at its current position.

Figure 21:
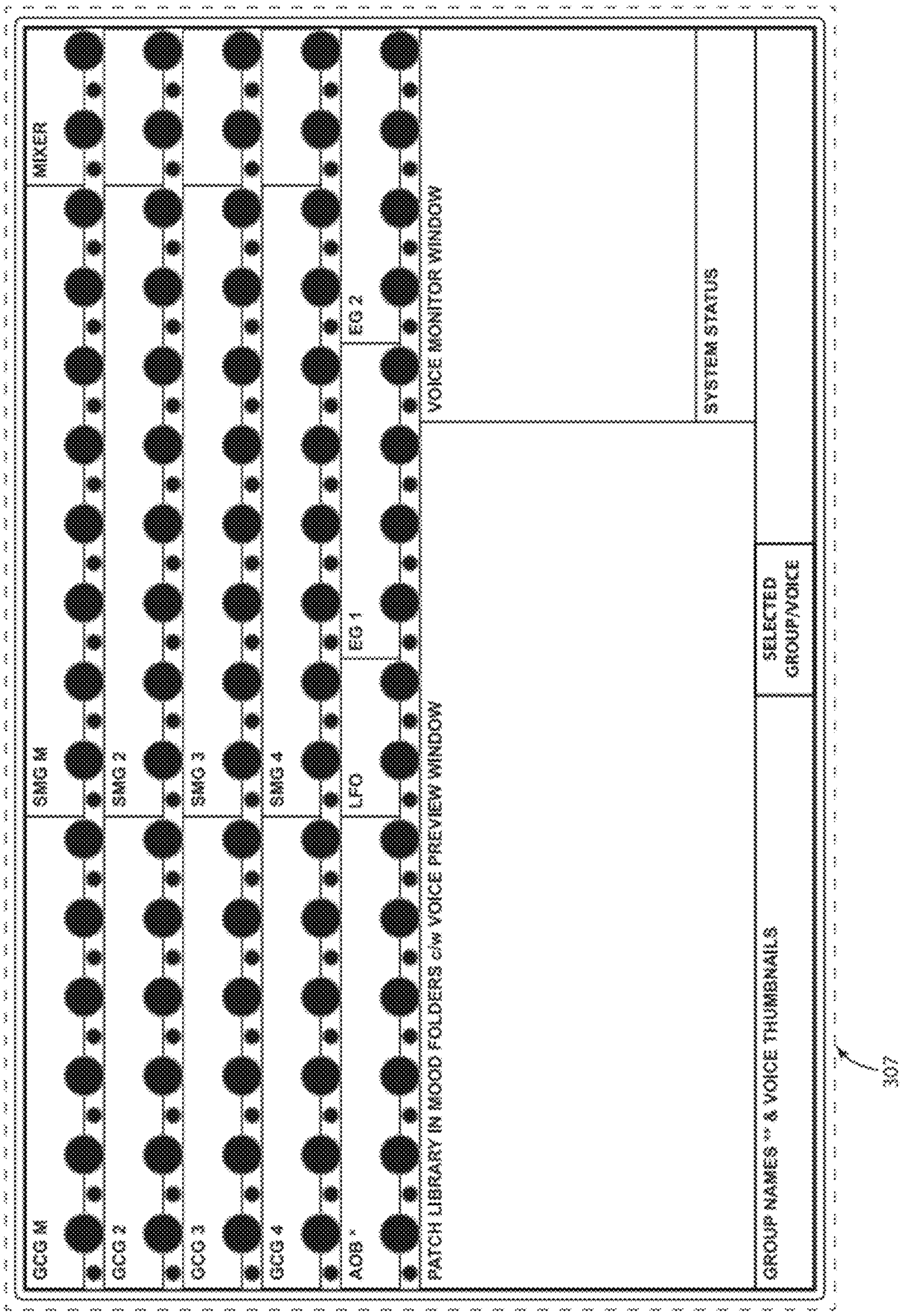
FIG. 21 illustrates detail of FIG. 14.

307—Shown in detail in FIG. 21—Main Touch Screen Controls. Top half includes touch and integrated physical controls for GCG, SMG and Mixer controls for each voice layer as well as generic controls for LFOs and EGs. The bottom half is a standard touch screen which will contain context sensitive information and controls. A keyboard and file manager may be overlaid as required.

Figure 22:
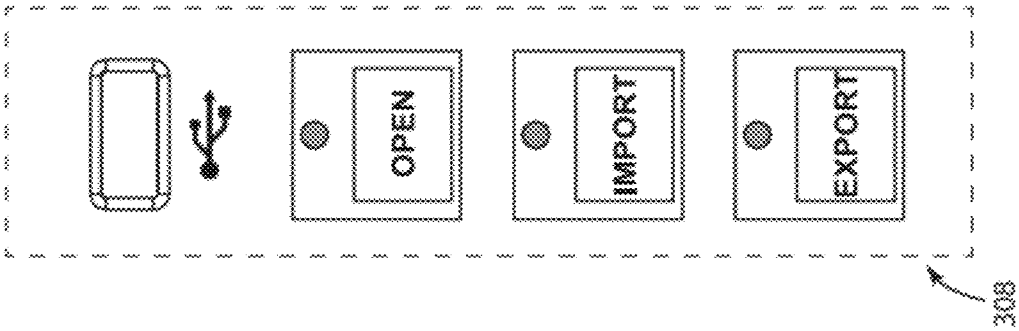
FIG. 22 illustrates detail of FIG. 14.

308—Shown in detail in FIG. 22—Memory Stick Management. Allows control of data storage and retrieval to a memory stick including, for example, opening, importing, and exporting files.

Figure 23:
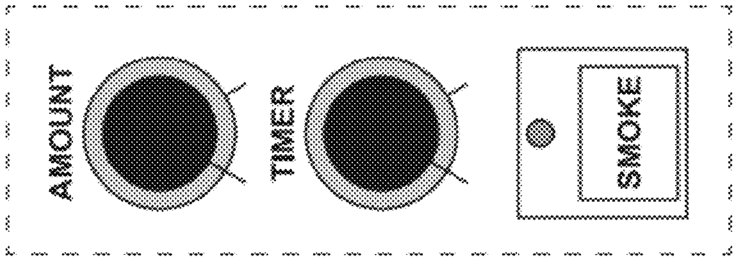
FIG. 23 illustrates detail of FIG. 14.

309—Shown in detail in FIG. 23—Fog Machine Control. Control of a connected fog machine, for example fog amount, fog time and manual controls.

Figure 24:
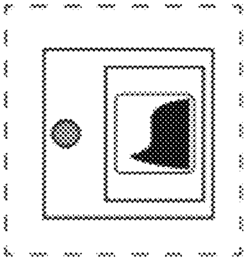
FIG. 24 illustrates detail of FIG. 14.

310—Shown in detail in FIG. 24—Modifier Key. A generic modifier or shift key that may, for example, allow selection of multiple groups simultaneously, provide access to file options and other functions as required.

Figure 25:
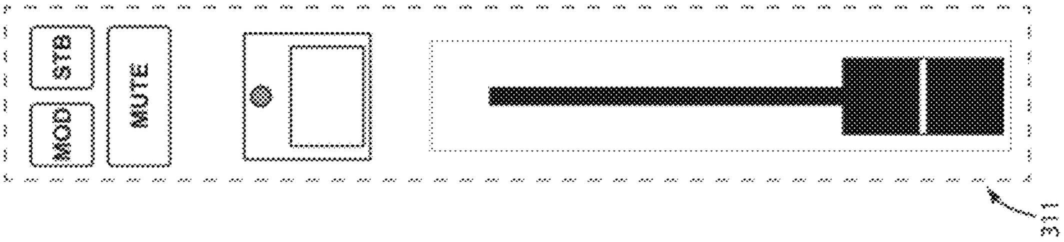
FIG. 25 illustrates detail of FIG. 14.

311—Shown in detail in FIG. 25—Group Controls. Controls for each of the groups arranged in a left to right, lowest to highest precedence, order. Controls may include means to assign that group to the modulation or bend wheels, means to assign that group to the master strobe control, a mute key to disable or silence that group and a fader and flash/go key for each group.

Figure 26:
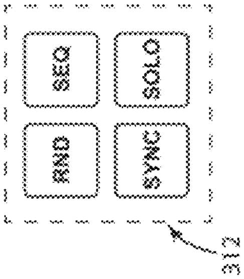
FIG. 26 illustrates detail of FIG. 14.

312—Shown in detail in FIG. 26—Strobe Options. Master strobe options that may include random strobing, sequential strobing, synchronized strobing and solo strobing.

Figure 27:
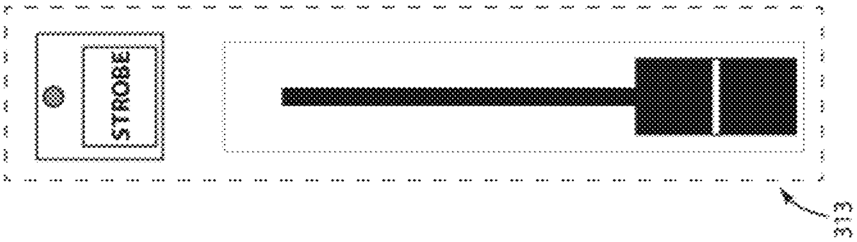
FIG. 27 illustrates detail of FIG. 14.

313—Shown in detail in FIG. 27—Strobe Control. Master strobe controls that may include a fader for strobe rate and a manual strobe flash/go key.

Figure 28:
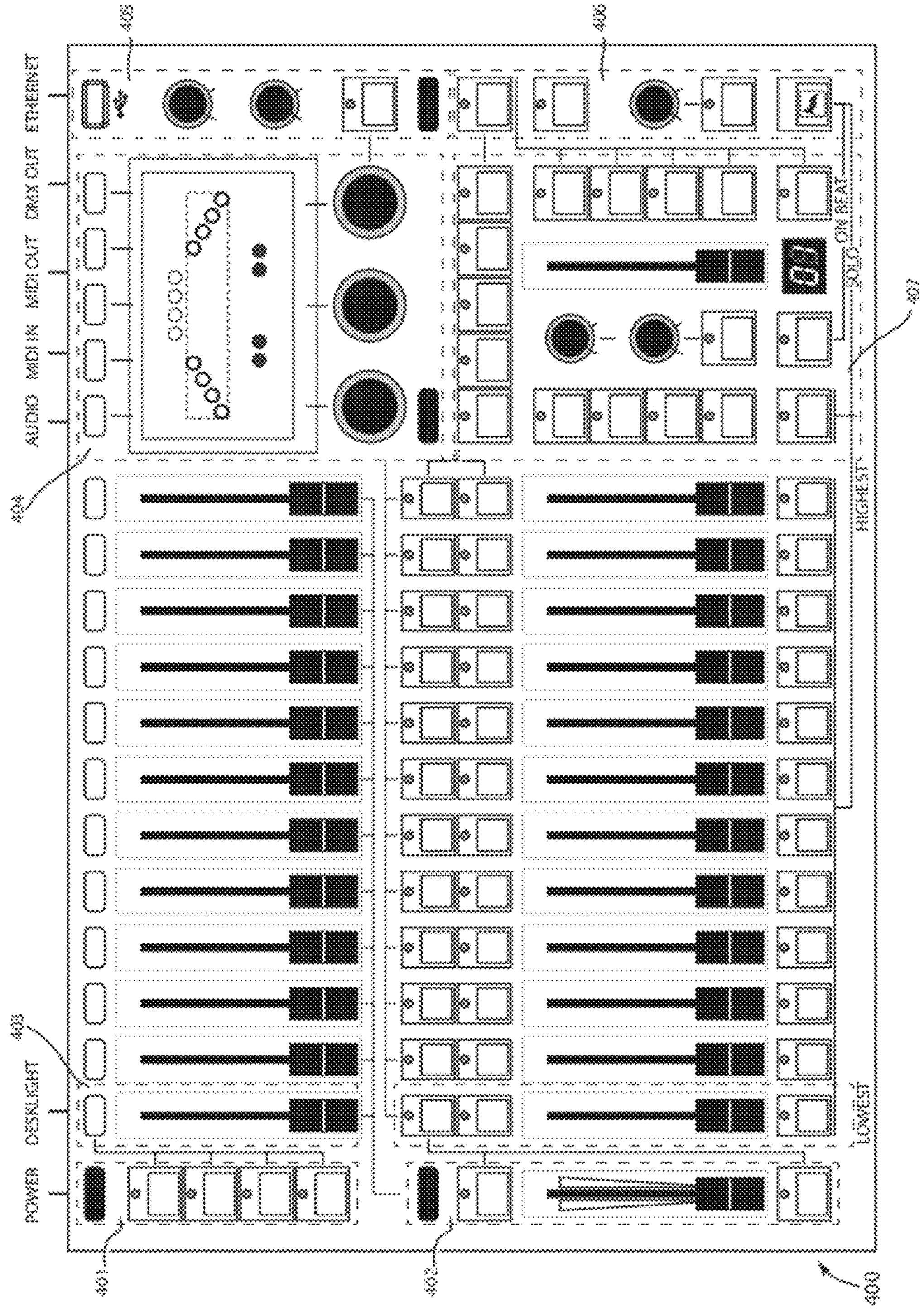
FIG. 28 illustrates a further user interface of an embodiment of the invention.
Figure 31:
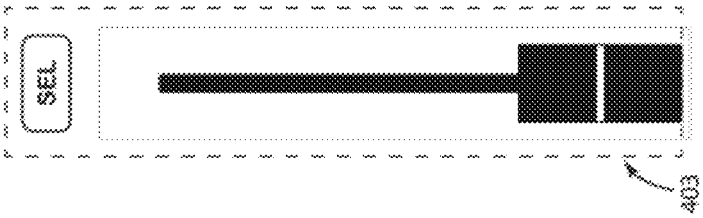
FIG. 31 illustrates detail of FIG. 28.
Figure 30:
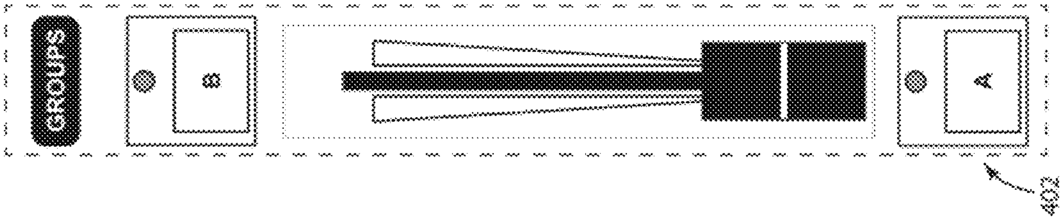
FIG. 30 illustrates detail of FIG. 28.
Figure 29:
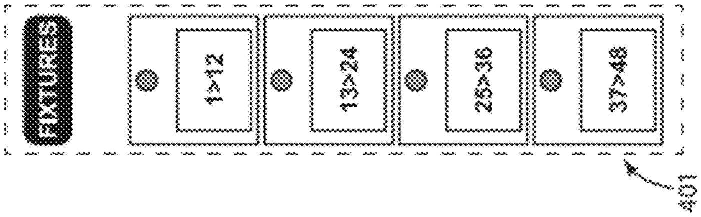
FIG. 29 illustrates detail of FIG. 28.
Figure 32:
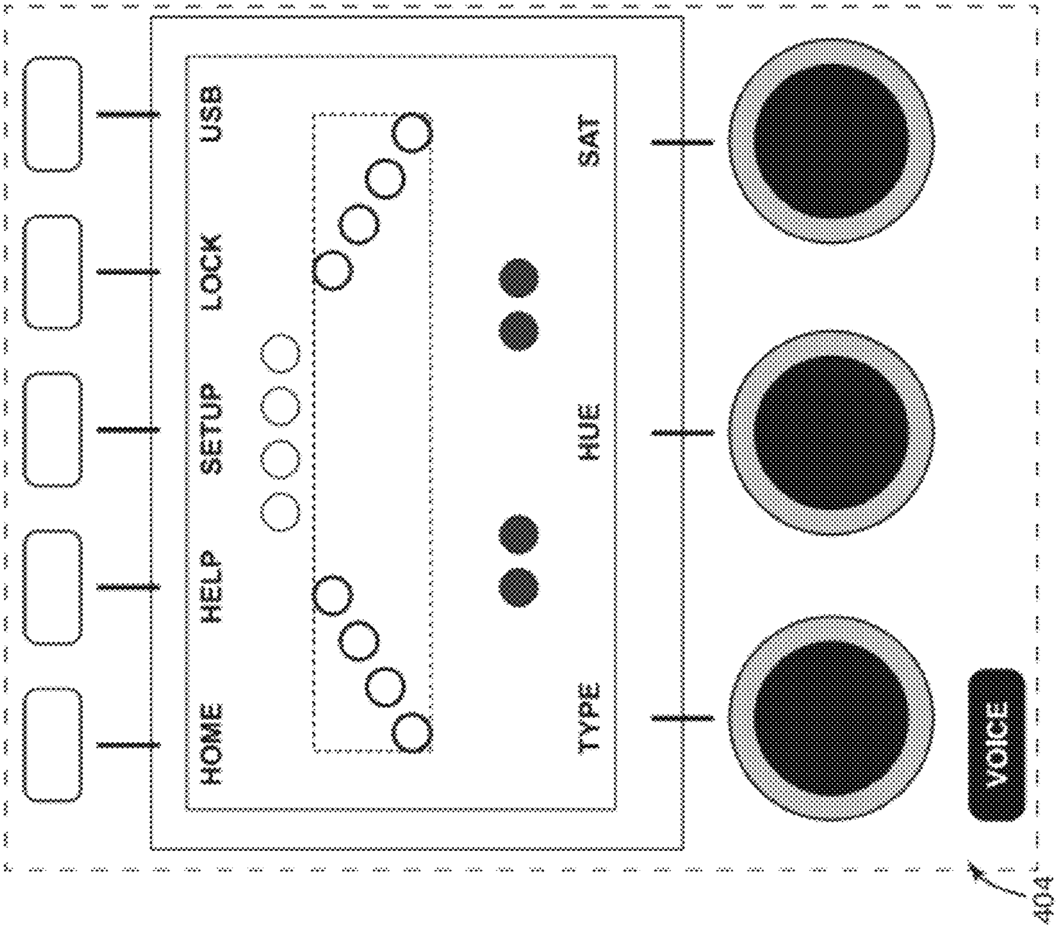
FIG. 32 illustrates detail of FIG. 28.
Figure 34:
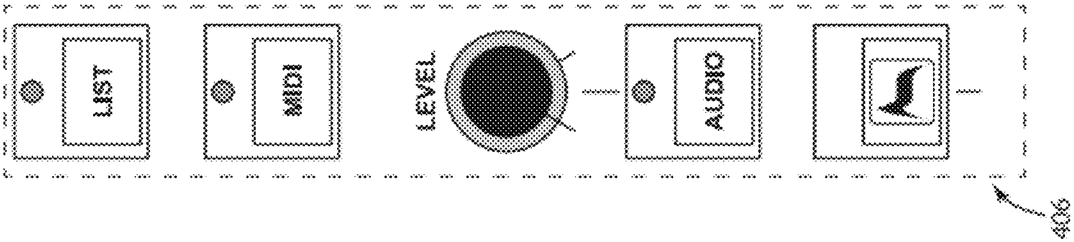
FIG. 34 illustrates detail of FIG. 28.
Figure 33:
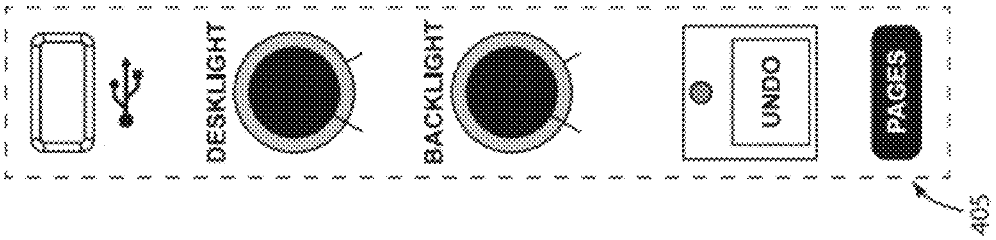
FIG. 33 illustrates detail of FIG. 28.
Figure 35:
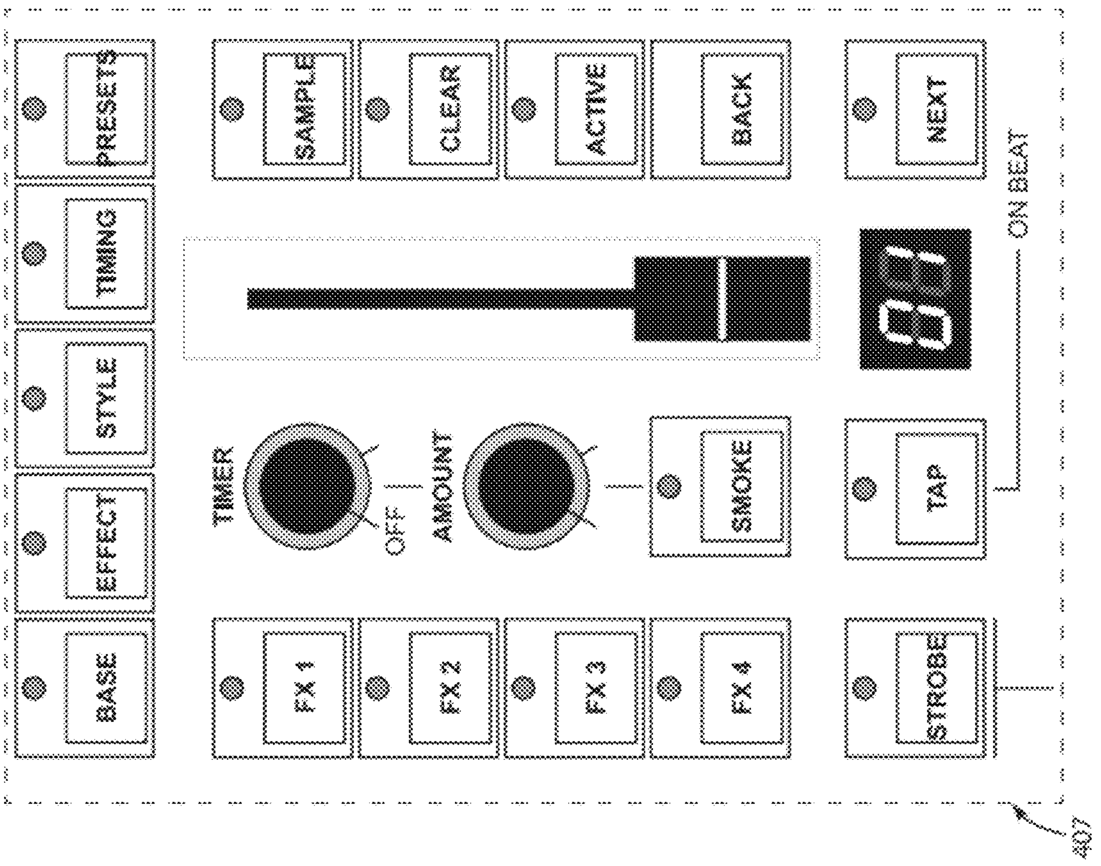
FIG. 35 illustrates detail of FIG. 28.

FIG. 28 illustrates a further user interface 400 of an embodiment of the invention. Details of interface panel are shown in FIGS. 29, 30, 31, 32, 33, 34 and 35. User interface 400 is an example of a smaller user interface than the user interface 300 illustrated in FIG. 14 that may be used in a nightclub or similar venue.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. A luminaire control system for multiparameter automated luminaires comprising:

incorporation of a mapping of an abstract canvas painted by light beams emitted from the luminaires in the system;

luminaires with individual controllable parameters that can change—light intensity or light color, or lighting intensity and lighting color;

the improvements comprising:

dynamic synthesizer controls of controllable parameters of the luminaires; and individual or groups of luminaires are controlled by—a geometry or a color generator or an intensity control synthesizer module.

2. A luminaire control system of claim 1 wherein:

includes luminaires with light beams that can be dynamically panned and/or tilted (whereby the direction of the light beam is changed) and/or project a light pattern that can be rotated.

3. A luminaire control system of claim 1 wherein:

the luminaires output is constrained to the abstract canvas but the abstract canvas is not constrained to coincide with physical surface(s) such as floor, wall or ceiling and this the luminaires output is not constrained to the physical surface whereby, if the abstract canvas coincides with a wall surface, the output of the luminaires is constrained to the wall but if the abstract canvas does not coincide with the wall, the luminaire output may be limited to part of the wall or may spill over the wall's boundaries.

4. A luminaire control system of claim 1 where:

the dynamic synthesizer control includes one or more of the following modules tied to the one or more of the controlled parameters: a VCO, a VCF, a VCP and/or VCA.

5. A luminaire lighting control system of claim 4 wherein:

the VCO, VCP or VCA module has a CV input.

6. A luminaire control system of claim 5 wherein:

the CV input is received to the module is received from user input, and/or a stored value, and/or an audio input, and/or random values.

7. A luminaire control system of claim 3 wherein:

the abstract canvas coincides with physical surface(s).

8. A luminaire control system of claim 3 wherein:

the degree to which the abstract canvas coincides with a physical is modulated by a dynamic synthesizer control module with a CV input.

9. A luminaire control system of claim 2 wherein:

an individual luminaire or group(s) of luminaires are controlled by geometry and color generator synthesizer module(s).

10. A luminaire control system of claim 2 wherein:

one or more luminaires are modulated or controlled by shape and motion generator synthesizer module(s).

11. A luminaire control system of claim 2 wherein:

one or more luminaires are modulated or controlled by geometry and color generator synthesizer module(s).

12. A luminaire control system of claim 1 wherein:

the user control includes a bend wheel, mod wheel, strobe control, and/or master voice control.

13. A luminaire control system of claim 5 wherein:

CV output has an ADSR waveform.

14. A luminaire control system for multiparameter automated luminaires comprising:

incorporation of a mapping of an abstract canvas painted by light beams emitted from the luminaires in the system;

luminaires with individual controllable parameters that can change—light intensity or light color, or lighting intensity and lighting color;

the improvements comprising:

dynamic synthesizer controls of controllable parameters of the luminaires; and an individual luminaire or group(s) of luminaires are controlled by geometry and color generator synthesizer module(s).

15. A luminaire control system of claim 14 wherein:

includes luminaires with light beams that can be dynamically panned and/or tilted (whereby the direction of the light beam is changed) and/or project a light pattern that can be rotated.

16. A luminaire control system of claim 14 wherein:

the luminaires output is constrained to the abstract canvas but the abstract canvas is not constrained to coincide with physical surface(s) such as floor, wall or ceiling and this the luminaires output is not constrained to the physical surface whereby, if the abstract canvas coincides with a wall surface, the output of the luminaires is constrained to the wall but if the abstract canvas does not coincide with the wall, the luminaire output may be limited to part of the wall or may spill over the wall's boundaries.

17. A luminaire control system of claim 14 where:

the dynamic synthesizer control includes one or more of the following modules tied to the one or more of the controlled parameters: a VCO, a VCF, a VCP and/or VCA.

18. A luminaire lighting control system of claim 4 wherein:

the VCO, VCP or VCA module has a CV input.

19. A luminaire control system of claim 18 wherein:

the CV input is received to the module is received from user input, and/or a stored value, and/or an audio input, and/or random values.

20. A luminaire control system of claim 16 wherein:

the abstract canvas coincides with physical surface(s).

21. A luminaire control system of claim 16 wherein:

the degree to which the abstract canvas coincides with a physical is modulated by a dynamic synthesizer control module with a CV input.

22. A luminaire control system of claim 14 wherein:

individual or groups of luminaires are controlled by a geometry or a color generator or and intensity control synthesizer module.

23. A luminaire control system of claim 14 wherein:

one or more luminaires are modulated or controlled by shape and motion generator synthesizer module(s).

24. A luminaire control system of claim 14 wherein:

one or more luminaires are modulated or controlled by geometry and color generator synthesizer module(s).

25. A luminaire control system of claim 14 wherein:

the user control includes a bend wheel, mod wheel, strobe control, and/or master voice control.

26. A luminaire control system of claim 18 wherein:

CV output has an ADSR waveform.

27. A luminaire control system for multiparameter automated luminaires comprising:

incorporation of a mapping of an abstract canvas painted by light beams emitted from the luminaires in the system;

luminaires with individual controllable parameters that can change—light intensity or light color, or lighting intensity and lighting color;

the improvements comprising:

dynamic synthesizer controls of controllable parameters of the luminaires; and one or more luminaires are modulated or controlled by shape and motion generator synthesizer module(s).

28. A luminaire control system of claim 27 wherein:

includes luminaires with light beams that can be dynamically panned and/or tilted (whereby the direction of the light beam is changed) and/or project a light pattern that can be rotated.

29. A luminaire control system of claim 27 wherein:

the luminaires output is constrained to the abstract canvas but the abstract canvas is not constrained to coincide with physical surface(s) such as floor, wall or ceiling and this the luminaires output is not constrained to the physical surface whereby, if the abstract canvas coincides with a wall surface, the output of the luminaires is constrained to the wall but if the abstract canvas does not coincide with the wall, the luminaire output may be limited to part of the wall or may spill over the wall's boundaries.

30. A luminaire control system of claim 27 where:

the dynamic synthesizer control includes one or more of the following modules tied to the one or more of the controlled parameters: a VCO, a VCF, a VCP and/or VCA.

31. A luminaire lighting control system of claim 30 wherein:

the VCO, VCP or VCA module has a CV input.

32. A luminaire control system of claim 31 wherein:

the CV input is received to the module is received from user input, and/or a stored value, and/or an audio input, and/or random values.

33. A luminaire control system of claim 28 wherein:

the abstract canvas coincides with physical surface(s).

34. A luminaire control system of claim 28 wherein:

the degree to which the abstract canvas coincides with a physical is modulated by a dynamic synthesizer control module with a CV input.

35. A luminaire control system of claim 27 wherein:

individual or groups of luminaires are controlled by a geometry or a color generator or and intensity control synthesizer module.

36. A luminaire control system of claim 28 wherein:

an individual luminaire or group(s) of luminaires are controlled by geometry and color generator synthesizer module(s).

37. A luminaire control system of claim 28 wherein:

one or more luminaires are modulated or controlled by geometry and color generator synthesizer module(s).

38. A luminaire control system of claim 27 wherein:

the user control includes a bend wheel, mod wheel, strobe control, and/or master voice control.

39. A luminaire control system of claim 31 wherein:

CV output has an ADSR waveform.

40. A luminaire control system for multiparameter automated luminaires comprising:

incorporation of a mapping of an abstract canvas painted by light beams emitted from the luminaires in the system;

luminaires with individual controllable parameters that can change—light intensity or light color, or lighting intensity and lighting color;

the improvements comprising:

dynamic synthesizer controls of controllable parameters of the luminaires; and one or more luminaires are modulated or controlled by geometry and color generator synthesizer module(s).

41. A luminaire control system of claim 40 wherein:
includes luminaires with light beams that can be dynamically panned and/or tilted (whereby the direction of the light beam is changed) and/or project a light pattern that can be rotated.

42. A luminaire control system of claim 40 wherein:
the luminaires output is constrained to the abstract canvas but the abstract canvas is not constrained to coincide with physical surface(s) such as floor, wall or ceiling and this the luminaires output is not constrained to the physical surface whereby, if the abstract canvas coincides with a wall surface, the output of the luminaires is constrained to the wall but if the abstract canvas does not coincide with the wall, the luminaire output may be limited to part of the wall or may spill over the wall's boundaries.

43. A luminaire control system of claim 40 where:
the dynamic synthesizer control includes one or more of the following modules tied to the one or more of the controlled parameters: a VCO, a VCF, a VCP and/or VCA.

44. A luminaire lighting control system of claim 43 wherein:
the VCO, VCP or VCA module has a CV input.

45. A luminaire control system of claim 44 wherein:
the CV input is received to the module is received from user input, and/or a stored value, and/or an audio input, and/or random values.

46. A luminaire control system of claim 42 wherein:
the abstract canvas coincides with physical surface(s).

47. A luminaire control system of claim 42 wherein:
the degree to which the abstract canvas coincides with a physical is modulated by a dynamic synthesizer control module with a CV input.

48. A luminaire control system of claim 40 wherein:
individual or groups of luminaires are controlled by a geometry or a color generator or and intensity control synthesizer module.

49. A luminaire control system of claim 40 wherein:
an individual luminaire or group(s) of luminaires are controlled by geometry and color generator synthesizer module(s).

50. A luminaire control system of claim 40 wherein:
one or more luminaires are modulated or controlled by shape and motion generator synthesizer module(s).

51. A luminaire control system of claim 40 wherein:
the user control includes a bend wheel, mod wheel, strobe control, and/or master voice control.

52. A luminaire control system of claim 44 wherein:
CV output has an ADSR waveform.

53. A luminaire control system for multiparameter automated luminaires comprising:
incorporation of a mapping of an abstract canvas painted by light beams emitted from the luminaires in the system;
luminaires with individual controllable parameters that can change—light intensity or light color, or lighting intensity and lighting color;
the improvements comprising:
dynamic synthesizer controls of controllable parameters of the luminaires; and
the dynamic synthesizer control includes one or more of the following modules tied to the one or more of the controlled parameters: a VCO, a VCF, a VCP and/or VCA.

54. A luminaire control system of claim 53 wherein:
includes luminaires with light beams that can be dynamically panned and/or tilted (whereby the direction of the light beam is changed) and/or project a light pattern that can be rotated.

55. A luminaire control system of claim 53 wherein:
the luminaires output is constrained to the abstract canvas but the abstract canvas is not constrained to coincide with physical surface(s) such as floor, wall or ceiling and this the luminaires output is not constrained to the physical surface whereby, if the abstract canvas coincides with a wall surface, the output of the luminaires is constrained to the wall but if the abstract canvas does not coincide with the wall, the luminaire output may be limited to part of the wall or may spill over the wall's boundaries.

56. A luminaire control system of claim 1 where:
the dynamic synthesizer control includes one or more of the following modules tied to the one or more of the controlled parameters: a VCO, a VCF, a VCP and/or VCA.

57. A luminaire lighting control system of claim 56 wherein:
the VCO, VCP or VCA module has a CV input.

58. A luminaire control system of claim 57 wherein:
the CV input is received to the module is received from user input, and/or a stored value, and/or an audio input, and/or random values.

59. A luminaire control system of claim 55 wherein:
the abstract canvas coincides with physical surface(s).

60. A luminaire control system of claim 55 wherein:
the degree to which the abstract canvas coincides with a physical is modulated by a dynamic synthesizer control module with a CV input.

61. A luminaire control system of claim 53 wherein:
individual or groups of luminaires are controlled by—a geometry or a color generator or and intensity control synthesizer module.

62. A luminaire control system of claim 54 wherein:
an individual luminaire or group(s) of luminaires are controlled by geometry and color generator synthesizer module(s).

63. A luminaire control system of claim 54 wherein:
one or more luminaires are modulated or fixtures are controlled by shape and motion generator synthesizer module(s).

64. A luminaire control system of claim 54 wherein:
one or more luminaires are modulated or fixtures are controlled by geometry and color generator synthesizer module(s).

65. A luminaire control system of claim 53 wherein:
the user control includes a bend wheel, mod wheel, strobe control, and/or master voice control.

66. A luminaire control system of claim 57 wherein:
CV output has an ADSR waveform.

* * * * *